US011297520B2

(12) United States Patent
Hosseini et al.

(10) Patent No.: US 11,297,520 B2
(45) Date of Patent: Apr. 5, 2022

(54) CHANNEL STATE INFORMATION REPORTING FOR SHORT TRANSMISSION TIME INTERVALS

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 48 days.

(21) Appl. No.: 16/057,593

(22) Filed: Aug. 7, 2018

(65) Prior Publication Data

US 2019/0053084 A1 Feb. 14, 2019

Related U.S. Application Data

(60) Provisional application No. 62/544,556, filed on Aug. 11, 2017.

(51) Int. Cl.
*H04W 24/10* (2009.01)
*H04L 1/00* (2006.01)
(Continued)

(52) U.S. Cl.
CPC .......... *H04W 24/10* (2013.01); *H04B 7/0626* (2013.01); *H04L 1/0023* (2013.01);
(Continued)

(58) Field of Classification Search
CPC ... H04L 1/0023; H04L 1/0027; H04L 5/0048; H04L 5/0057; H04L 5/0094;
(Continued)

(56) References Cited

U.S. PATENT DOCUMENTS 9,385,852 B2\* 7/2016 Hammarwall ....... H04B 7/0626
2011/0249584 A1 10/2011 Barbieri et al.
(Continued)

FOREIGN PATENT DOCUMENTS

CN 107027181 A 8/2017
TW 201804831 A 2/2018
(Continued)

OTHER PUBLICATIONS

Mediatek Inc: "Channel Design for Shortened TTI in FDD", 3GPP Draft; R1-162945—LATRED FDD V2, 3rd Generation Partnership Project (3GPP), Mobile Competence Centre, 650, Route Des Lucioles, F-06921 Sophia-Antipolis Cedex, France, vol. RAN WG1, No. Busan, Korea; Apr. 11, 2016-Apr. 15, 2016 Apr. 2, 2016, XP051080429, Retrieved from the Internet: URL:http://www.3gpp.org/ftp/tsg_ran/ WG1_RL1/TSGR1_84b/Docs/ [retrieved on Apr. 2, 2016], 6 pages.
(Continued)

*Primary Examiner* — Chi H Pham
*Assistant Examiner* — Weibin Huang
(74) *Attorney, Agent, or Firm* — Terry Tsai

(57) ABSTRACT

Methods, systems, and devices are described for wireless communications. A first CSI reporting configuration may be used for communications using TTIs of a first duration and a second CSI reporting configuration may be used for communications using TTIs of a second duration. A determination of whether to report CSI based on the first and/or second configuration may be made, and a CSI report may be transmitted based on the determination. In some cases, CSI for the first CSI reporting configuration is determined differently than CSI for the second CSI reporting configuration. For instance, the CSI reporting configurations may use different reference resources and/or reference signal resources when calculating respective CSI. In some cases, the first and second CSI reporting configurations may be
(Continued)

configured as a first CSI process and a second CSI process, which may be operated either independently or jointly.

35 Claims, 17 Drawing Sheets

(51) Int. Cl.
    *H04L 5/00*           (2006.01)
    *H04B 7/06*           (2006.01)
    *H04W 72/12*        (2009.01)

(52) U.S. Cl.
    CPC .......... *H04L 1/0027* (2013.01); *H04L 5/0048* (2013.01); *H04L 5/0057* (2013.01); *H04L 5/0094* (2013.01); *H04W 72/1273* (2013.01); *H04W 72/1284* (2013.01); *H04L 5/0007* (2013.01)

(58) Field of Classification Search
    CPC ......... H04W 72/1273; H04W 72/1284; H04W 24/10; H04B 7/0626
    See application file for complete search history.

(56) References Cited

U.S. PATENT DOCUMENTS

| | | | |
|---|---|---|---|
| 2012/0208547 A1* | 8/2012 | Geirhofer | H04L 5/0032 455/452.2 |
| 2015/0288500 A1 | 10/2015 | Montojo et al. | |
| 2016/0205676 A1* | 7/2016 | Chen | H04B 7/0641 370/329 |
| 2017/0034831 A1 | 2/2017 | Yerramalli et al. | |
| 2017/0171842 A1 | 6/2017 | You et al. | |
| 2017/0215186 A1 | 7/2017 | Chen et al. | |
| 2017/0230992 A1 | 8/2017 | Patel et al. | |
| 2017/0290004 A1* | 10/2017 | Yang | H04W 72/0446 |
| 2018/0206265 A1* | 7/2018 | Lee | H04W 72/0413 |
| 2018/0375619 A1* | 12/2018 | Hwang | H04W 72/0446 |
| 2019/0116583 A1* | 4/2019 | Sahlin | H04W 72/042 |
| 2019/0222379 A1* | 7/2019 | Kim | H04L 5/0092 |
| 2019/0312669 A1* | 10/2019 | Kwak | H04L 1/00 |
| 2019/0349175 A1* | 11/2019 | Bagheri | H04L 5/0051 |

FOREIGN PATENT DOCUMENTS

| | | |
|---|---|---|
| WO | 2017032331 A1 | 3/2017 |
| WO | 2017048324 A1 | 3/2017 |
| WO | 2017124232 A1 | 7/2017 |

OTHER PUBLICATIONS

Partial International Search Report—PCT/US2018/045854—ISA/EPO—dated Nov. 28, 2018.
Qualcomm Incorporated: "CSI Reporting for Shortened TTI", 3GPP Draft; R1-1708774 CSI Reporting for Shortened TTI, 3rd Generation Partnership Project (3GPP), Mobile Competence Centre, 650, Route Des Lucioles, F-06921 Sophia-Antipolis Cedex, France, vol. RAN WG1, No. Hangzhou, China; May 15, 2017-May 19, 2017 May 14, 2017, XP051273957, Retrieved from the Internet: URL:http://www.3gpp.org/ftp/Meetings_3GPP_SYNC/RAN1/Docs/ [retrieved on May 14, 2017], 3 pages.
International Search Report and Written Opinion—PCT/US2018/045854—ISA/EPO—dated Jan. 21, 2019.
Huawei, et al., "Discussion on CSI Feedback for 1ms TTI and short TTI", 3GPP TSG RAN WG1 Meeting #88, R1-1701743, Athens, Greece, Feb. 13-17, 2017, 3 Pages.
LG Electronics: "Discussion on PUCCH Design for CSI in Shortened TTI", 3GPP TSG RAN WG1 Meeting #84bis, R1-162508, Busan, Korea, Apr. 11-15, 2016, 5 Pages.
Nokia, et al., "On DL Control Channel Design for Shorter TTI Operation," 3GPP Draft, R1-1704806, 3GPP TSG-RAN WG1, Meeting #88bis, Spokane, U.S.A, Apr. 3-7, 2017, XP051242942, pp. 1-9, Retrieved from the Internet: URL: http://www.3gpp.orgjftp/Meetings_3GPP_SYNC/RAN1/Docs/ [retrieved on Apr. 2, 2017].
Pedersen K.I., et al., "System Level Analysis of Dynamic User-Centric Scheduling for a Flexible 5G Design", Feb. 6, 2017, 2016 IEEE Global Communications Conference (GLOBECOM).
Taiwan Search Report—TW107127770—TIPO—dated Oct. 21, 2021.
Zhou B., et al., "BER Analysis and Sounding Optimization for TDD LTE/LTE-A Systems with Imperfect Channel State Information at Transmitter", 241 Pages, Sep. 6, 2015.

* cited by examiner

CHANNEL STATE INFORMATION REPORTING FOR SHORT TRANSMISSION TIME INTERVALS

CROSS REFERENCES

The present application for patent claims priority to U.S. Provisional Patent Application No. 62/544,556 by HOSSEINI, et al., entitled "CHANNEL STATE INFORMATION REPORTING FOR SHORT TRANSMISSION TIME INTERVALS," filed Aug. 11, 2017, assigned to the assignee hereof and incorporated herein by reference in its entirety.

BACKGROUND

The following relates generally to wireless communication, and more specifically to channel state information (CSI) reporting for short transmission time intervals (TTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In multiple-access systems, such as TDMA and OFDMA systems, wireless communication resources may be partitioned into time intervals (e.g., symbol periods, slots, subframes, etc.) in the time domain and into frequency bands (e.g., sub-carriers, carriers, sub-bands, bands, etc.) in the frequency domain. The partitioned communication resources may be referred to as a resource map. In some cases, the time intervals and frequency bands are associated with numerical identifiers (e.g., subframe number, system frame number, carrier number, etc.), which may be used to identify particular communication resources within a resource map. For instance, a base station may use the numerical identifiers when scheduling particular communication resources for one or more particular UEs. In some cases, a minimum scheduling interval, which may be referred to as a TTI, is used when scheduling communication resources in a wireless communications system. For instance, a subframe may be an example of a minimum scheduling interval, and a base station may schedule a UE to receive or transmit information over communication resources that span one or more subframes.

In some examples, a first set of UEs may communicate with a base station using TTIs of one length, while a second set of UEs may communicate with the base station using TTIs of a different length. For instance, a base station may communicate low latency information to the first set of UEs using short TTIs (e.g., TTIs spanning two or three symbol periods), and may communicate non-low latency information to the second set of UEs using long TTIs (e.g., TTIs spanning 14 symbol periods).

In some cases, CSI reporting may be used to increase the reliability of a communications link. For example, a UE may generate a CSI report based on channel conditions observed by the UE, and transmit the CSI report to a base station. In some cases, the base station may modify transmission parameters for a subsequent transmission to the UE based on the information received in the CSI report. In some cases, a UE generates a CSI report for communications that use long TTIs, and a base station modifies transmission parameters for a subsequent transmission to the UE based on the CSI report. In some cases, the base station also uses the modified transmission parameters for a subsequent transmission to the UE that uses short TTIs based on the CSI report.

However, the modified transmission parameters may be sub-optimal for communications using short TTIs. For example, the CSI report may not take into account rapid changes in channel conditions experienced by the UE (e.g., bursty interference that is present in two or three symbol periods of a subframe), and the determined transmission parameters may not compensate for these changes.

SUMMARY

Enhanced channel state information (CSI) reporting techniques may be used to generate CSI for communications using low latency transmission time intervals (TTIs). In one example, a first CSI reporting configuration may be used for communications using TTIs of a first duration and a second CSI reporting configuration may be used for communications using TTIs of a second duration. A determination of whether to report CSI based on the first and/or second configuration may be made, and a CSI report may be transmitted based on the determination. In some cases, CSI for the first CSI reporting configuration is determined differently than CSI for the second CSI reporting configuration. For instance, the CSI reporting configurations may use different reference resources and/or reference signal resources when calculating respective CSI. In some cases, the first and second CSI reporting configurations may be configured as a first CSI process and a second CSI process, which may be operated either independently or jointly.

A method of wireless communication is described. The method may include identifying a first CSI reporting configuration associated with TTIs of a first duration, identifying a second CSI reporting configuration associated with TTIs of a second duration that is shorter than the first duration, determining whether to report CSI for the first CSI reporting configuration or the second CSI reporting configuration, or both, and transmitting a CSI report in accordance with the determination.

An apparatus for wireless communication is described. The apparatus may include means for identifying a first CSI reporting configuration associated with TTIs of a first duration, means for identifying a second CSI reporting configuration associated with TTIs of a second duration that is shorter than the first duration, means for determining whether to report CSI for the first CSI reporting configuration or the second CSI reporting configuration, or both, and means for transmitting a CSI report in accordance with the determination.

Another apparatus for wireless communication is described. The apparatus may include a processor, memory in electronic communication with the processor, and instructions stored in the memory. The instructions may be operable to cause the processor to identify a first CSI reporting configuration associated with TTIs of a first duration, identify a second CSI reporting configuration associated with TTIs of a second duration that is shorter than the first duration, determine whether to report CSI for the first CSI reporting configuration or the second CSI reporting configuration, or both, and transmit a CSI report in accordance with the determination.

A non-transitory computer readable medium for wireless communication is described. The non-transitory computer-readable medium may include instructions operable to cause a processor to identify a first CSI reporting configuration associated with TTIs of a first duration, identify a second CSI reporting configuration associated with TTIs of a second duration that is shorter than the first duration, determine whether to report CSI for the first CSI reporting configuration or the second CSI reporting configuration, or both, and transmit a CSI report in accordance with the determination.

Some examples of the method, apparatus, and non-transitory computer-readable medium described above may further include processes, features, means, or instructions for identifying, from either the TTIs of the first duration or the TTIs of the second duration, at least one reference resource for determining CSI.

In some examples of the method, apparatus, and non-transitory computer-readable medium described above, identifying the at least one reference resource comprises: identifying a TTI of the first duration based at least in part on determining to report CSI for the second CSI reporting configuration, wherein the TTI comprises the at least one reference resource.

Some examples of the method, apparatus, and non-transitory computer-readable medium described above may further include processes, features, means, or instructions for generating CSI for the second CSI reporting configuration based at least in part on the second duration, wherein the CSI report comprises the CSI generated in accordance with the second CSI reporting configuration.

In some examples of the method, apparatus, and non-transitory computer-readable medium described above, receiving configuration information comprising a first periodicity, a second periodicity, a first offset, and a second offset, wherein identifying the at least one reference resource comprises: identifying, for the first CSI reporting configuration, a first set of TTIs of the first duration based on the first periodicity and the first offset. Some examples of the method, apparatus, and non-transitory computer-readable medium described above may further include processes, features, means, or instructions for identifying, for the second CSI reporting configuration, a second set of TTIs of the first duration based on the second periodicity and the second offset.

Some examples of the method, apparatus, and non-transitory computer-readable medium described above may further include processes, features, means, or instructions for receiving a request for the CSI report during a first TTI of the first duration, wherein the request schedules a reporting resource, and wherein identifying the at least one reference resource comprises identifying a second TTI of the first duration based at least in part on determining to report CSI for the second CSI reporting configuration, wherein the second TTI may be identified relative to the reporting resource.

In some examples of the method, apparatus, and non-transitory computer-readable medium described above, the request may be received in a third TTI of the second duration that occurs during the first TTI.

Some examples of the method, apparatus, and non-transitory computer-readable medium described above may further include processes, features, means, or instructions for receiving a request for the CSI report during a first TTI of the first duration, wherein identifying the at least one reference resource comprises identifying a second TTI of the second duration at least in part on determining to report CSI for the second CSI reporting configuration, wherein the second TTI comprises the at least one reference resource and occurs during the first TTI.

Some examples of the method, apparatus, and non-transitory computer-readable medium described above may further include processes, features, means, or instructions for receiving a request for the CSI report during a first TTI of the first duration, wherein identifying the at least one reference resource comprises identifying a second TTI of the second duration based at least in part on determining to report CSI for the second CSI reporting configuration, wherein the second TTI comprises the at least one reference resource and occurs before the first TTI in time.

Some examples of the method, apparatus, and non-transitory computer-readable medium described above may further include processes, features, means, or instructions for identifying the at least one reference resource comprises identifying a multicast-broadcast single frequency network (MBSFN) subframe based at least in part on determining to report CSI for the second CSI reporting configuration, wherein the MBSFN subframe comprises the at least one reference resource.

Some examples of the method, apparatus, and non-transitory computer-readable medium described above may further include processes, features, means, or instructions for generating CSI for the second CSI reporting configuration based at least in part on the first set of reference signals in a control region, wherein the MBSFN subframe comprises the control region having a first set of reference signals and a data region lacking reference signals.

Some examples of the method, apparatus, and non-transitory computer-readable medium described above may further include processes, features, means, or instructions for identifying a second set of reference signals during a TTI that may be before the MBSFN subframe in time, wherein the CSI generated for the second CSI reporting configuration may be generated based at least in part on the second set of reference signals.

In some examples of the method, apparatus, and non-transitory computer-readable medium described above, the second set of reference signals may be located within a predetermined time period relative to the MBSFN subframe, the predetermined time period based at least in part on a TTI of the second duration.

Some examples of the method, apparatus, and non-transitory computer-readable medium described above may further include processes, features, means, or instructions for associating a first CSI process with the first CSI reporting configuration and a second CSI process with the second CSI reporting configuration.

Some examples of the method, apparatus, and non-transitory computer-readable medium described above may further include processes, features, means, or instructions for generating a first CSI report for the first CSI process or a second CSI report for the second CSI process, or both, wherein the CSI report comprises the first CSI report or the second CSI report, or both.

In some examples of the method, apparatus, and non-transitory computer-readable medium described above, the first CSI process may be operated independently from the second CSI process.

In some examples of the method, apparatus, and non-transitory computer-readable medium described above, the first CSI process for the first CSI reporting configuration may be triggered independently from the second CSI process for the second CSI reporting configuration.

In some examples of the method, apparatus, and non-transitory computer-readable medium described above, the first CSI process for the first CSI reporting configuration may be associated with a first periodicity and a first offset, and wherein the second CSI process for the second CSI reporting configuration may be associated with a second periodicity and a second offset.

In some examples of the method, apparatus, and non-transitory computer-readable medium described above, the first CSI process may be operated jointly with the second CSI process.

Some examples of the method, apparatus, and non-transitory computer-readable medium described above may further include processes, features, means, or instructions for identifying a first pattern of first non-zero power (NZP) reference signal resources and first interference measurement (IM) resources for the first CSI reporting configuration, wherein the first pattern may be associated with a first periodicity and a first offset. Some examples of the method, apparatus, and non-transitory computer-readable medium described above may further include processes, features, means, or instructions for determining a second pattern of second NZP reference signal resources and second IM resources for the second CSI reporting configuration, wherein the second pattern may be associated with a second periodicity and a second offset.

Some examples of the method, apparatus, and non-transitory computer-readable medium described above may further include processes, features, means, or instructions for determining a third pattern of zero power (ZP) reference signal resources based at least in part on the first pattern. Some examples of the method, apparatus, and non-transitory computer-readable medium described above may further include processes, features, means, or instructions for determining a fourth pattern of ZP reference signal resources based at least in part on the second pattern.

In some examples of the method, apparatus, and non-transitory computer-readable medium described above, a TTI of the second duration comprises ZP reference signal resources of the third pattern, and wherein the first IM resources overlap with the second IM resources, and wherein the ZP reference signal resources of the third pattern overlap with ZP reference signal resources of the fourth pattern.

In some examples of the method, apparatus, and non-transitory computer-readable medium described above, the first NZP reference signal resources overlap with the second NZP reference signal resources.

In some examples of the method, apparatus, and non-transitory computer-readable medium described above, the second periodicity may be higher than the first periodicity.

In some examples of the method, apparatus, and non-transitory computer-readable medium described above, a resource element density of the second pattern may be lower than a resource element density of the first pattern.

Some examples of the method, apparatus, and non-transitory computer-readable medium described above may further include processes, features, means, or instructions for identifying a first pattern of first NZP reference signal resources and first IM resources for the first CSI reporting configuration, wherein the first pattern may be associated with a first periodicity and a first offset. Some examples of the method, apparatus, and non-transitory computer-readable medium described above may further include processes, features, means, or instructions for receiving an indication of a presence of one or more NZP reference signal resources and one or more IM resources for the second CSI reporting configuration in a TTI of the first duration, wherein the TTI of the first duration comprises a subset of the first NZP reference signal resources and a subset of the first IM resources of the first pattern.

In some examples of the method, apparatus, and non-transitory computer-readable medium described above, a TTI of the second duration comprises one or more NZP reference signal resources of the subset of the first NZP reference signal resources and one or more IM resources of the subset of the first IM resources, wherein the one or more NZP reference signal resources for the second reporting configuration overlap with the one or more NZP reference signal resources of the subset of the first NZP reference signal resources, and wherein the one or more IM resources for the second CSI reporting configuration overlap with the one or more IM resources of the subset of the first IM resources.

Some examples of the method, apparatus, and non-transitory computer-readable medium described above may further include processes, features, means, or instructions for generating first CSI for the first CSI reporting configuration and second CSI for the second CSI reporting configuration, wherein a size of the first CSI may be greater than a size of the second CSI. Some examples of the method, apparatus, and non-transitory computer-readable medium described above may further include processes, features, means, or instructions for generating the CSI report comprising the first CSI or the second CSI, or both.

Some examples of the method, apparatus, and non-transitory computer-readable medium described above may further include processes, features, means, or instructions for generating the first CSI comprises determining first channel quality information (CQI) for at least one subband of a first size, and wherein generating the second CSI comprises determining second CQI for at least one subband of a second size that may be larger than the first size.

Some examples of the method, apparatus, and non-transitory computer-readable medium described above may further include processes, features, means, or instructions for generating the first CSI comprises determining the first CSI according to one of a plurality of reporting modes, and wherein generating the second CSI comprises determining the second CSI according to a subset of the plurality of reporting modes.

Some examples of the method, apparatus, and non-transitory computer-readable medium described above may further include processes, features, means, or instructions for receiving uplink data for transmission with the CSI report, wherein second CSI of the second size for the second CSI reporting configuration may be generated based at least in part on the uplink data.

In some examples of the method, apparatus, and non-transitory computer-readable medium described above, the CSI report and data may be transmitted according to a first interval.

Some examples of the method, apparatus, and non-transitory computer-readable medium described above may further include processes, features, means, or instructions for generating third CSI for the second CSI reporting configuration based at least in part on a lack of uplink data for transmission, wherein a size of the third CSI may be the same, or greater, than a size of the second CSI.

In some examples of the method, apparatus, and non-transitory computer-readable medium described above, the CSI report may be transmitted according to a second interval that may be as long as, or longer, than the first interval.

Some examples of the method, apparatus, and non-transitory computer-readable medium described above may further include processes, features, means, or instructions for receiving a first downlink transmission over a first downlink resource of a third duration. Some examples of the method, apparatus, and non-transitory computer-readable medium described above may further include processes, features, means, or instructions for identifying an uplink resource of the third duration. Some examples of the method, apparatus, and non-transitory computer-readable medium described above may further include processes, features, means, or instructions for generating CSI of a first size for the second CSI reporting configuration. Some examples of the method, apparatus, and non-transitory computer-readable medium described above may further include processes, features, means, or instructions for receiving a second downlink transmission over a second downlink resource of the third duration. Some examples of the method, apparatus, and non-transitory computer-readable medium described above may further include processes, features, means, or instructions for identifying an uplink resource of a fourth duration that may be greater than the third duration. Some examples of the method, apparatus, and non-transitory computer-readable medium described above may further include processes, features, means, or instructions for generating CSI of a second size, greater than the first size, for the second CSI reporting configuration.

Some examples of the method, apparatus, and non-transitory computer-readable medium described above may further include processes, features, means, or instructions for receiving a plurality of downlink transmissions over a plurality of downlink resources of a third duration, wherein the plurality of downlink transmissions may be associated with an uplink transmission of a fourth duration. Some examples of the method, apparatus, and non-transitory computer-readable medium described above may further include processes, features, means, or instructions for identifying a request for the CSI report in one downlink transmission of the plurality of downlink transmissions.

A method of wireless communication is described. The method may include identifying a first CSI reporting configuration associated with TTIs of a first duration, identifying a second CSI reporting configuration associated with TTIs of a second duration that is shorter than the first duration, configuring a wireless device to report CSI for the first CSI reporting configuration or the second CSI reporting configuration, or both, and receiving a CSI report in accordance with the determination.

An apparatus for wireless communication is described. The apparatus may include means for identifying a first CSI reporting configuration associated with TTIs of a first duration, means for identifying a second CSI reporting configuration associated with TTIs of a second duration that is shorter than the first duration, means for configuring a wireless device to report CSI for the first CSI reporting configuration or the second CSI reporting configuration, or both, and means for receiving a CSI report in accordance with the determination.

Another apparatus for wireless communication is described. The apparatus may include a processor, memory in electronic communication with the processor, and instructions stored in the memory. The instructions may be operable to cause the processor to identify a first CSI reporting configuration associated with TTIs of a first duration, identify a second CSI reporting configuration associated with TTIs of a second duration that is shorter than the first duration, configure a wireless device to report CSI for the first CSI reporting configuration or the second CSI reporting configuration, or both, and receive a CSI report in accordance with the determination.

A non-transitory computer readable medium for wireless communication is described. The non-transitory computer-readable medium may include instructions operable to cause a processor to identify a first CSI reporting configuration associated with TTIs of a first duration, identify a second CSI reporting configuration associated with TTIs of a second duration that is shorter than the first duration, configure a wireless device to report CSI for the first CSI reporting configuration or the second CSI reporting configuration, or both, and receive a CSI report in accordance with the determination.

DETAILED DESCRIPTION

Figure 1:
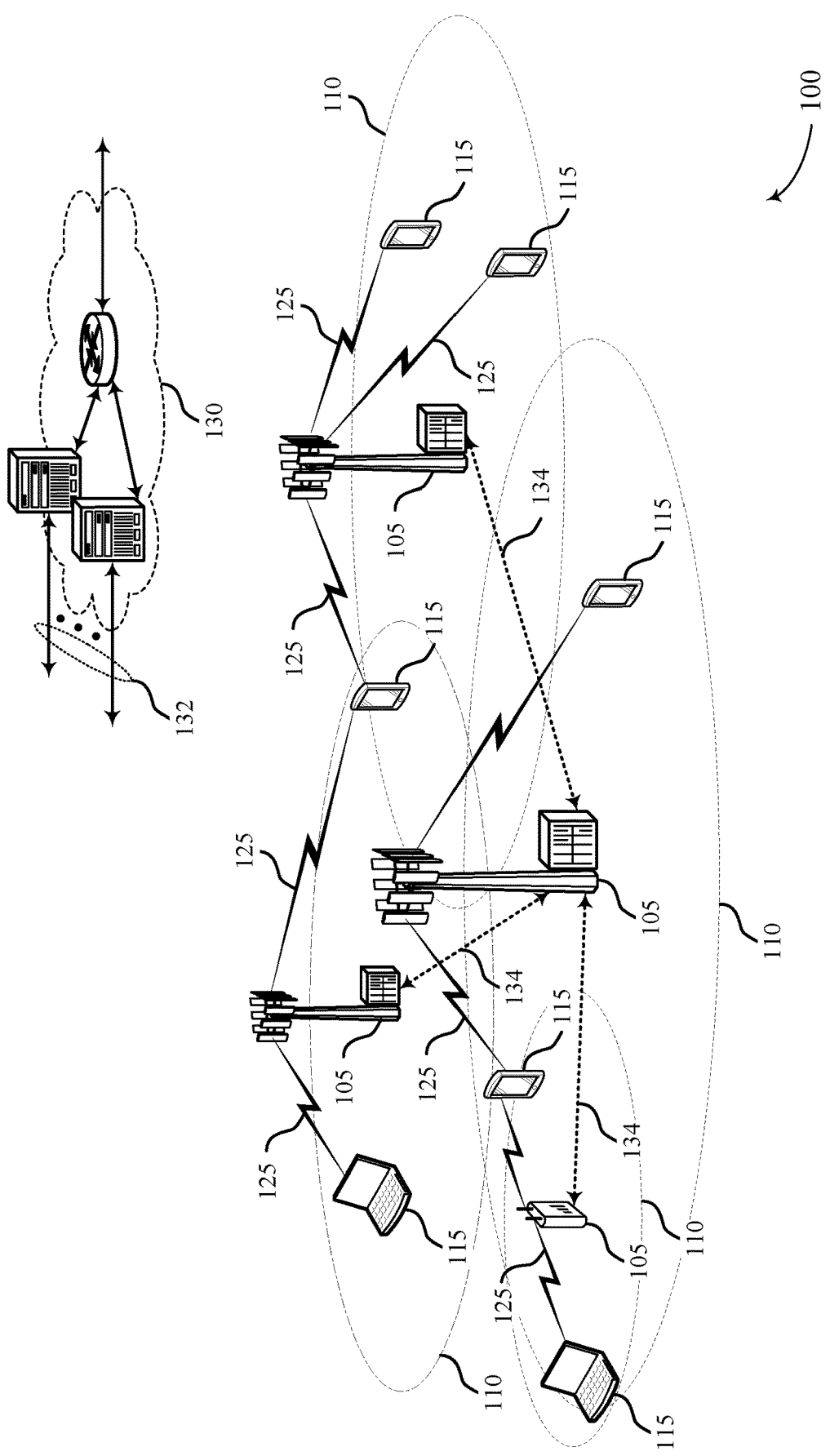
FIG. 1 illustrates an example of a wireless communications system that supports channel state information (CSI) reporting for short transmission time intervals (TTIs) in accordance with various aspects of the present disclosure.

A base station and user equipment (UE) may communicate with one another using transmission time intervals (TTI)s of a first duration (e.g., 1 ms) (or "non-low latency TTIs" or "long TTIs") as a minimum scheduling interval. Accordingly, the base station and UE may configure communication processes, such as channel state information (CSI) reporting, based on the minimum scheduling interval—e.g., may use reference resources that span the minimum scheduling interval with a periodicity that supports a latency corresponding to the minimum scheduling interval. In some cases, a base station and UE may also communicate with one another using TTIs of a second duration, which may be shorter than the first duration, as a minimum scheduling interval. In some cases, a TTI of the second duration may be referred to as a "low latency TTI" or a "short TTI" (also known as an sTTI), and may be a 1 orthogonal frequency division multiplexing (OFDM) symbol TTI (which may be 71.4 µs in length), a 2 OFDM symbol TTI (which may be 142.8 µs in length), a 3 OFDM symbol TTI (which may be 214.3 µs in length), or a 7 OFDM symbol TTI (which may be 0.5 ms in length)), for example. In some cases, communication processes that support communications using TTIs of the first duration fail to support or result in degraded performance for communications using low latency TTIs.

Thus, enhanced CSI reporting techniques may be used to generate CSI for communications using low latency TTIs. For instance, a first CSI reporting configuration may be used for reporting CSI for communications that use TTIs of a first duration and a second CSI reporting configuration may be used for reporting CSI for communications that use TTIs of a second duration. For example, a first CSI reporting configuration may be used for communications using non-low latency TTIs and a second CSI reporting configuration may be used for communications using low latency TTIs.

CSI reference resources used for non-low latency CSI reporting may not be suitable to support low latency CSI reporting, thus additional CSI reference resources may be identified for the second CSI reporting configuration. A CSI reference resource may be composed of a particular group of communication resources and may be used by a wireless device to determine CSI, such as a channel quality indicator (CQI) index. In some cases, a first CSI reference resource is identified for the first CSI reporting configuration and a second CSI reference resource is identified for the second CSI reporting configuration, where the second reference resource may support low latency communications. For instance, the second CSI reference resource may use multicast broadcast single frequency network (MBSFN) subframes.

In some cases, the first CSI reference resource and the second CSI reference resource span a long TTI. In some cases, CSI for the second CSI reference resource may be generated based on a duration of a short TTI—e.g., by performing a transport block size calculation based on a two or three symbol length of the short TTI. In some cases, the second CSI reference resource spans a short TTI. In some cases, a trigger for reporting CSI is received in a short TTI, and the second CSI reference resource is located within the short TTI. In other cases, a trigger for reporting CSI is received in a short TTI, and the second CSI reference resource is located in another short TTI relative to a reporting TTI scheduled by the trigger (e.g., $n-n_{CQI}$, where $n_{CQI}$ acts as a pointer to the other short TTI).

In some cases, the first and second CSI reporting configurations are considered to be separate CSI processes, and are operated—e.g., triggered or configured—separately. In some cases, the separate CSI process are operated jointly—e.g., triggering or configuring one CSI process triggers or configures the other.

Reference signal resources, such as CSI-reference signals (RS) and interference measurement (IM) resources, configured for non-low latency CSI reporting may not support low latency CSI reporting; thus, additional CSI reporting resources (e.g., uplink symbol(s), slots or subframes) may be utilized for the low latency configuration. For example, low latency CSI reporting may be supported by identifying RS resources for the second CSI reporting configuration. In some cases, a low latency pattern, which may include CSI-RS and/or interference measurement (IM) resources, may be implemented for the second CSI reporting configuration. For instance, the resource element pattern may be configured with a higher periodicity than a non-low latency pattern for the first CSI reporting configuration. In some examples, CSI-RS resources of the low latency pattern may overlap with CSI-RS resources of the non-low latency pattern. In some cases, the CSI-RS resources of the low latency pattern may completely overlap with the CSI-RS resources of the non-low latency pattern—e.g., the low latency pattern may use the CSI-RS resources of the non-low latency pattern as its own.

IM resources for the low latency pattern may also overlap with IM resources for the non-low latency pattern. In some cases, the IM resources of the low latency might have the same pattern as the non-low latency, or use a subset of resource elements (REs) used for the legacy IM resources pattern. For example, when the low latency and non-low latency IM resources overlap in one subframe, they may both be covered by a non-low latency zero power (ZP) CSI-RS pattern. Hence, the legacy users can rate-match their reception over the low latency IM resource REs as before. Thus, the addition of the low latency patterns may not impact the performance of the legacy users. However, in some cases, low latency IM resources (and also low latency non-zero power (NZP) CSI-RS) may be sent more frequently as compared with non-low latency IM and/or NZP CSI-RS resources, and the low latency IM resources cannot always be covered by the non-low latency ZP CSI-RS patterns. In such cases, non-low latency UEs may be unaware of the presence of the low latency IMR/NZP CSI-RS, and may be unable to perform rate-matching.

In some cases, the low latency CSI-RS/IM resources may not be configured periodically but may be dynamically indicated (e.g., in downlink control information (DCI)). In some cases, the low latency CSI-RS/IM resources may be semi-persistently scheduled (e.g., in downlink control information (DCI)). In some cases, the low latency CSI-RS/IM resources may be scheduled to overlap with non-low latency CSI-RS/IM resources, similar to the above discussion. For example, the low latency CSI-RS/IM resources may only be scheduled in sTTIs spanning symbols that carry non-low latency CSI-RS and IM resources.

Low latency CSI reporting may increase the processing workload for a wireless device; thus, low latency CSI reporting may use enhanced techniques for processing CSI. For example, CSI for a low latency CSI reporting may be calculated using increased sub-band sizes relative to sub-band sizes used for non-low latency CSI reporting. In some cases, certain CSI reporting types may be excluded, or only certain CSI reporting types may be allowed, for low latency CSI reporting. For example, low latency CSI reporting may be limited to reporting types that do not report a precoding matrix indicator (PMI) or to reporting types that report a single wide-band PMI. Restricted PMI codebooks may also be used.

In some cases, low latency CSI reporting may be based on whether uplink data is transmitted with a CSI report. For example, aperiodic CSI reporting with uplink data may use a size-restricted CSI and may report the CSI in accordance with the uplink scheduling timeline (e.g., n+4). While aperiodic CSI reporting without uplink data may use CSI without, or with reduced, size restrictions. The aperiodic CSI reporting without uplink data may also report CSI according to the same or a longer timeline (e.g., n+6) than the uplink scheduling timeline. In some cases, the size of low latency CSI is based on an asymmetry in downlink and uplink short TTIs. For instance, the size of low latency CSI may be larger if a downlink TTI spans two symbols and an uplink TTI spans seven symbols.

Features of the disclosure introduced above are further described below in the context of a wireless communication system. Specific examples are then described of an example process flow that supports CSI reporting for short TTIs. These and other features of the disclosure are further illustrated by and described with reference to apparatus diagrams, system diagrams, and flowcharts that relate to CSI reporting for short TTIs.

FIG. 1 illustrates an example of a wireless communications system 100 that supports CSI reporting for short TTIs in accordance with various aspects of the present disclosure. The wireless communications system 100 includes base stations 105, user equipment (UEs) 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. In accordance with aspects of the present disclosure, the wireless communications system 100 may support CSI reporting for short TTIs, and more specifically, implementing a first CSI reporting configuration for non-low latency communications and a second CSI reporting configuration for low latency communications.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or a machine-type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Base stations 105 may wirelessly communicate with UEs 115 via one or more base station antennas. Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

Base stations 105 may also communicate with one another. For example, base stations 105 may communicate with one another over backhaul links 134 (e.g., via an X2 or other interface) either directly (e.g., directly between base stations 105) or indirectly (e.g., via core network 130). Base stations 105 may also communicate with the core network 130. For example, base stations 105 may interface with the core network 130 through backhaul links 132 (e.g., via an S1 or other interface).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include ten subframes numbered from 0 to 9, and each subframe may have a duration of 1 ms. A subframe may be further divided into two slots each having a duration of 0.5 ms, and each slot may contain six or seven modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe (e.g., may be one or two symbol periods) or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 and base stations 105 may also use CSI reporting to increase the reliability of communications. For example, a UE 115 may generate and transmit a CSI report to a base station 105, which may modify transmission parameters for subsequent transmissions based on the received CSI report—e.g., a base station 105 may use a higher modulation order for subsequent transmissions when a UE 115 indicates good channel conditions, increasing the throughput of subsequent communications.

The CSI report may include multiple feedback components including a CSI-RS resource indicator (CRI), rank indicator (RI), a PMI (e.g., PMI-1 and PMI-2), a CQI, or some combination of these components. In some cases, the generated CSI report differs based on a TTI configuration for communications. For instance, communications using non-low latency TTIs may support up to 8-layer transmissions, while communications using low latency TTIs may support up to 4-layer transmissions. Thus, the CSI component calculations may be different based on the TTI configuration.

The CRI component may be used to indicate which CSI-RS resource is used for a corresponding RI/PMI/CQI measurements (i.e., which transmission beam of multiple beamformed transmissions is preferred). The RI component may be used to recommend a number of transmission layers (i.e., the rank) for the base station 105 to use in subsequent transmissions based on the signal/interference to noise (SINR) of a previous transmission received at the UE 115. The size of the RI component may be based on the number of transmit layers used by the base station 105.

The PMI component may be used to signal preferred weights to be applied during the precoding process, where the signaled weights may increase the S/N ratio of transmissions received at the UE 115. The PMI component may be separated into two sub-components: PMI-1 and PMI-2. PMI-1 may be associated with channel conditions of the full frequency band and/or long-term channel conditions, while PMI-2 may be associated with channel conditions of fixed frequency subbands and/or short-term channel conditions. In some aspects, PMI-2 may be reported per fixed frequency subband. Thus, the size of the PMI-2 component may be proportional to the number of fixed frequency subbands within the frequency band used for downlink transmissions to the UE. In some cases, only wideband PMI is reported, reducing the size of the PMI component.

Typically, the UE 115 and the base station 105 agree on a codebook that includes preferred precoding matrices for downlink transmissions. In some aspects, the codebook includes a long-term sub-codebook, associated with relatively slow changes in channel conditions, and a short-term sub-codebook, associated with channel conditions that change at an increased rate. Oftentimes, a precoding matrix codebook is defined per rank (e.g., rank 1 is associated with a first codebook, rank 2 is associated with a second codebook, and so on). Moreover, the number of bits used to convey different precoding matrices is often different based on a selected codebook. Thus, the size of both PMI component may also vary based on the rank selected by the UE 115. In order to reduce PMI feedback, a UE 115 may use sub-sampled codebooks, which include a subset of the precoding matrices available in a full codebook.

The CQI component may be used to signal channel quality information to the base station 105, and the base station 105 may use the information in the CQI component to select a modulation and coding scheme (MCS) for subsequent transmissions. Similar to the PMI-2 components, CQI may be reported per fixed frequency subband. Thus, the size of the CQI component may be proportional to the number of fixed frequency subbands within the frequency band used for downlink transmissions to the UE 115. The CQI component may include multiple indices (e.g., index 0 to index 15) that correspond to particular modulation and coding schemes.

To determine a CQI index for each frequency subband, the UE 115 may identify a single physical downlink shared channel (PDSCH) transport block (which may be referred to as the CSI reference resource) occupying a group of downlink physical resources blocks. In some cases, the CSI reference resource may be identified relative to an uplink subframe designated for reporting CQI. The UE 115 may then determine a combination of a modulation scheme and transport block size for the PDSCH transport block that corresponds to the highest CQI index associated with the PDSCH transport block being received with a transport block error probability that does not exceed 0.1. A modulation scheme and transport block size corresponds to a CQI index if the combination could be signaled from transmission on the PDSCH in the CSI reference resource according to the relevant transport block size table; the modulation scheme is indicated by the CQI index; and the combination of transport block size and modulation scheme when applied to the reference resource results in the effective channel code rate which is the closest possible to the code rate indicated by the CQI index.

In some examples, CQI is based on common references signals (CRS) included in a downlink transmission—e.g., transmission modes (TMs) 1 through 8 may use CRS. In some examples, CQI is based on CSI-RS included in a downlink transmission—e.g., TMs 9 and 10 may use CSI-RS. For instance, for TM 9, when parameter pmi-RI-report is configured by higher layers and the parameter eMIMO-type is not configured by higher layers, the UE may derive CQI based on NZP CSI-RS. In some instances, for TM 10, when parameter eMIMO-type is configured by higher layers, the UE may derive the channel measurements for computing CQI corresponding to a CSI process based on NZP CSI-RS within a CSI-RS resource associated with the CSI process. And when parameter eMIMO-type is not configured by higher layers, the UE may derive interference measurements for computing CQI corresponding to a CSI process based on CSI-IM resources associated with the CSI process. TMs 9 and 10 may support MIMO communications.

A UE may also use a full dimension-MIMO (FD-MIMO) TM, which may be similar to TMs 9 and 10. Each of the above TMs may implement either non-low latency or low latency transmission, or both. A UE 115 may be configured to transmit according to a first transmission mode for non-low latency communications and a second transmission mode for low-latency communications. Or a UE 115 may be configured to transmit both non-low latency and low-latency communications according to a same transmission mode.

In some examples, the CQI index calculation is a function of the length of the CSI reference resource. In some cases, the CSI reference resource is prohibited from using certain types of subframes, such as MBSFN subframes, which may not have CRS in the data region.

CSI reporting may be configured either periodically or aperiodically. For periodic CSI reporting, a base station 105 may direct a UE 115 to report CSI according to a specified interval. In some aspects, the specified interval is unique in either the time or frequency domain from intervals specified to other UEs 115 within the coverage area. The base station 105 may expect a response from the UE 115 during the specified interval using specified resources and correlate information received during that interval with the scheduled UE 115. That is, the base station 105 may identify a UE 115 based on the time and frequency resources used to convey the CSI report. In some aspects, the periodic CSI may be reported using physical uplink control channel (PUCCH) resources.

For aperiodic reporting, a base station 105 may send a trigger to the UE 115 that triggers the UE 115 to report CSI. After receiving the trigger, the UE 115 may transmit the CSI to the base station 105. In some aspects, the aperiodic CSI report may be transmitted using physical uplink shared channel (PUSCH) resources, and a base station 105 may receive the CSI report over the scheduled resources.

In some examples, multiple CSI process are configured at a time. Each CSI process may be associated with an index, and for aperiodic reporting, a UE 115 may update a determined number of the lowest indexed CSI process. For instance, the UE 115 may update N of the lowest-indexed CSI processes, where N=max($N_x$-$N_u$, 0), $N_{CSI-P}$ is the maximum number of supported CSI process, and $N_u$ is the number of unreported CSI processes associated with other aperiodic CSI requests for the serving cell. For an FDD serving cell: $N_x$=$N_{CSI-P}$.

As discussed above, a UE 115 and base station 105 may communicate using TTIs of a first size and TTIs of a second size. In some examples, CSI reporting is configured to support TTIs of the first size—e.g., the CSI reference resource is configured to span 1 ms, CSI and reference signal resources are configured with a periodicity that supports 1 ms communications, etc. To support CSI reporting for TTIs of a second size, the UE 115 and base station 105 may establish a second CSI configuration that is configured to support TTIs of the second size—e.g., the CSI reference resource may be configured to span 2 or 3 symbol periods, the reference signal resources may be configured with a periodicity that supports low latency communications, etc.

Figure 2:
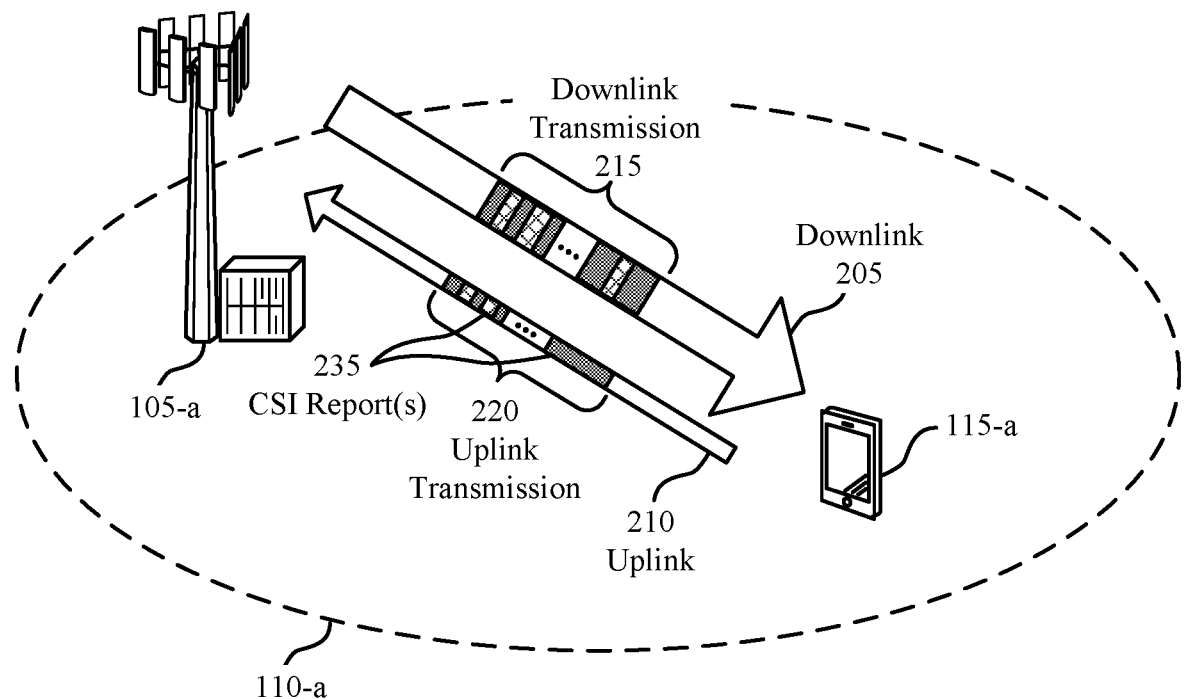
FIG. 2 illustrates an example of a wireless communications subsystem that supports CSI reporting for short TTIs in accordance with various aspects of the present disclosure.

FIG. 2 illustrates an example of a wireless communications subsystem 200 that supports CSI reporting for short TTIs in accordance with various aspects of the present disclosure. Wireless communications subsystem 200 may include UE 115-a and base station 105-a, which may be examples of a UE 115 or a base station 105 and may communicate with one another as described above with reference to FIG. 1. Wireless communications subsystem 200 may also include downlink 205, uplink 210, downlink transmission 215, uplink transmission 220, TTIs 225, sTTIs 230, and CSI reports 235.

Downlink 205 may be used to communicate control information and user data from base station 105-a to UE 115-a. Downlink 205 may be composed of time and frequency resources in a component carrier. Uplink 210 may be used to communication control information and user data from UE 115-a to base station 105-a. Uplink 210 may be composed of time and frequency resources in a component carrier. In some cases, uplink 210 uses a smaller amount of frequency resources than downlink 205.

Downlink transmission 215 may carry control and/or user data from base station 105-a to UE 115-a. Downlink transmission 215 may also include reference signal resources to enable channel estimation. In some cases, downlink transmission 215 may be transmitted over a subset of the time and frequency resources used by downlink 205. In some examples, UE 115-a may identify which time and frequency resources are used by downlink transmission 215 based on a grant received from base station 105-a. Uplink transmission 220 may carry control and/or user data from UE 115-a to base station 105-a. In some cases, uplink transmission 220 may be transmitted over a subset of the time and frequency resources used by uplink 210. In some examples, UE 115-a may identify which time and frequency resources are scheduled for uplink transmission 220 based on an uplink grant received from base station 105-a.

TTI 225 may be the minimum scheduling resource used when scheduling communications of a first configuration between base station 105-a and UE 115-a. For instance, for non-low latency communications between base station 105-a and UE 115-a, TTI 225 may span 1 ms. In some cases, resources for downlink transmission 215 and uplink transmissions may be scheduled on a TTI-by-TTI basis. In some examples, a first CSI reporting scheme may be used for communications that use TTI 225 as a minimum scheduling interval.

STTI 230 may be the minimum scheduling resource used when scheduling communications of a second configuration between base station 105-a and UE 115-a. In some cases, sTTI 230 may be shorter than TTI 225 and may vary in length. For instance, for low latency communications between base station 105-a and UE 115-a, sTTI 230 may be a 1 OFDM symbol TTI, a 2 OFDM symbol TTI, a 3 OFDM symbol TTI, or a 7 OFDM symbol TTI. In some examples, a second CSI reporting scheme may be used for communications that use sTTI 230 as a minimum scheduling interval.

CSI reports 235 may carry CSI and may be used to determine transmission parameters that optimize the use of the communication resources—e.g., the CSI may cause a base station to use a higher MCS to take advantage of a high signal-to-noise ratio (SNR) or to use a lower MCS to increase reliability of transmissions when a low SNR is present. As discussed above, CSI reports 235 may include a CRI, a RI, a PMI, and/or a CQI.

In some cases, base station 105-a configures UE 115-a to report CSI on a periodic basis. In some examples, base station 105-a provides UE 115-a with an offset and periodicity, which UE 115-a may use to identify the particular downlink and uplink resources that support CSI reporting. For example, UE 115-a may identify one or more CSI reporting resources for transmitting a CSI report based on the provided offset and periodicity. UE 115-a may also identify one or more CSI reference resources for computing CSI values based on the reporting resources. For example, UE 115-a may identify CSI reference resources relative to the CSI reporting resources—e.g., a CSI reference resource may be located $n_{CQI}$ TTIs or sTTIs away from a reporting TTI or sTTI resource, whose location may be denoted as n. In some examples, UE 115-a may receive configuration information for a low latency CSI configuration and configuration information for a non-low latency CSI.

In one example, base station 105-a transmits downlink transmission 215 to UE 115-a over downlink 205. Downlink transmission 215 may include transmissions that are configured based on a length of TTI 225 and transmissions that are configured based on a length of sTTI 230. Downlink transmission 215 a may also include a CSI reference resource for a low latency CSI reporting configuration and a CSI reference resource for a non-low latency CSI reporting configuration. In some cases, UE 115-a may receive downlink transmission 215 and may identify the low latency CSI reference resource and the non-low latency CSI reference resource in downlink transmission 215. In some cases, UE 115-a may identify the low latency CSI reference resource based on received low latency configuration information and may identify the non-low latency CSI reference resource based on received non-low latency configuration information.

In some cases, UE 115-a identifies that the low latency CSI reference resource spans a TTI 225. After identifying the low latency CSI reference resource, UE 115-a may determine a CQI index for the CSI reference resource, as discussed above—e.g., by determining a modulation scheme and transport block size that corresponds to the highest CQI index that supports a<0.1 error probability. In some cases, UE 115-a may assume a two or three symbol sTTI length when determining the highest CQI index. In other cases, UE 115-a identifies that the low latency CSI reference resources spans an sTTI 230.

In some examples, UE 115-a identifies that the low latency CSI reference resource is located in an MB SFN subframe of downlink transmission 215, or a subframe that has CRS in the control region but not the data region. UE 115-a may use the CRS in the control region for channel estimation and when determining the CQI index. In some cases, interference statistics are different in the control and data regions, and UE 115-*a* may use CRS received in the data region of subframes that precede the MBSFN subframe to estimate interference. In some cases, UE 115-*a* limits the number of previous subframes including CRS in the data region that are considered based on low latency considerations—e.g., UE 115-*a* may use CRS from subframes that occurred 2 to 3 ms before the MBSFN subframe. In some cases, the use of an MBSFN subframe as a low latency CSI reference resource is based on a configured transmission mode at UE 115-*a*. For example, MBSFN subframes may not be used as low latency CSI reference resource when UE 115-*a* is configured for any one of transmission modes 1-8.

In some examples, non-low latency CSI reports and low latency CSI reports may be computed differently—e.g., based on each configuration supporting different numbers of transmission layers. In some cases, a first RRC configuration is established for non-low latency CSI reports and a second RRC configuration is established for low latency CSI reports. For periodic reporting, the first RRC configuration may include a first set of reporting modes and first periodicity and the second RRC configuration may include a second set of reporting modes and second periodicity.

Base station 105-*a* may also schedule UE 115-*a* to report CSI aperiodically. For instance, base station 105-*a* may trigger UE 115-*a* to prepare a CSI report 235 during downlink transmission 215. If UE 115-*a* is triggered to prepare a CSI report in downlink transmission 215, then UE 115-*a* may determine CSI based on a reference resource included in downlink transmission 215. In some cases, UE 115-*a* receives multiple downlink sTTIs 230 in downlink transmission 215 that correspond to a single uplink sTTI 230 scheduled in uplink transmission 220. In some examples, the trigger may be sent in only one of the multiple downlink sTTIs 230. In some examples, UE 115-*a* may determine that one or more CSI resources are located in downlink transmission 215. For instance, UE 115-*a* may determine that CSI resources for a low latency CSI configuration and CSI resources for a non-low latency CSI configuration are present in downlink transmission 215.

In one example, base station 105-*a* transmits downlink transmission 215 to UE 115-*a* over downlink 205. Downlink transmission 215 may include transmissions that are configured based on TTI 225 and transmissions that are configured based on sTTI 230. Downlink transmission 215 may also include a trigger for CSI reporting and a CSI reference resource for a low latency CSI reporting configuration. In some cases, UE 115-*a* may receive downlink transmission 215 and may identify the CSI reporting trigger and may identify a low latency CSI reference resource in downlink transmission 215.

In some examples, UE 115-*a* may identify that the low latency CSI reference resource spans the TTI 225 carrying the trigger. In other cases, UE 115-*a* may identify that the low latency CSI reference resource spans the sTTI 230 that the trigger is received in. UE 115-*a* may use CRS symbols included in the CSI reference resource to perform interference and channel measurements. In some examples, UE 115-*a* may identify that the low latency CSI reference resource is an sTTI 230 located in a subframe that precedes the subframe carrying the trigger. For instance, UE 115-*a* may determine that the sTTI 230 is in a subframe that is $n_{CQI}$ away from the subframe carrying the trigger.

In some examples, non-low latency CSI reports and low latency CSI reports may be computed differently—e.g., based on each configuration supporting different numbers of transmission layers. In some cases, low latency CSI reporting may be triggered separately from or jointly with non-low latency CSI reporting. For instance, the trigger may include a CSI request field that can be set to trigger one or both of the CSI reporting configuration—e.g., a first bit value (e.g., '00') may trigger low latency CSI reporting, a second bit value (e.g., '01') may trigger non-low latency CSI reporting, and a third bit value (e.g., '10') may trigger both low latency and non-low latency CSI reporting.

The CSI process capability may be defined jointly or separately. For example, the non-low latency CSI process and the low latency CSI reporting may be assigned separate indices or may be assigned a common index. In some examples, a non-low latency CSI reporting configuration is considered to be a separate CSI process than a low latency CSI reporting configuration. In some examples, updating CSI for one or more low latency CSI process may occur separate from updating CSI for one or more non-low latency CSI processes. In some cases, a UE may update CSI for a low latency CSI process based on whether an index assigned to the low latency CSI process is one of N lowest-indexed low latency CSI processes. For example, the UE 115 may update N of the lowest-indexed low latency CSI processes (e.g., when a low latency CSI trigger is received), where $N=\max(N_x-N_u, 0)$, $N_{CSI-P}$ is the maximum number of supported low latency CSI processes, and $N_u$ is the number of unreported low latency CSI processes. The UE may separately update CSI for a non-low latency CSI process based on whether an index assigned to the non-low latency CSI process is one of N lowest-indexed non-low latency CSI processes (e.g., when a non-low latency CSI trigger is received), where $N=\max(N_x-N_u, 0)$, $N_{CSI-P}$ is the maximum number of supported non-low latency CSI processes, and $N_u$ is the number of unreported non-low latency CSI processes.

In some cases, base station 105-*a* may transmit reference signals in downlink transmission 215. For example, base station 105-*a* may transmit CRS and/or CSI-RS in downlink transmission 215. Base station 105-*a* may also configure IM resources during downlink transmission 215. For CRS based CSI reporting (e.g., transmission modes 1-8 and 9 without PMI), UE 115-*a* may calculate low latency CSI using CRS resources.

For CSI-RS and/or IM based CSI reporting (e.g., transmission modes 9, 10 and FD-MIMO), CSI-RS and IM resources may be used to support low latency CSI reporting. Downlink transmission 215 may include CSI-RS resources, which may include NZP and ZP CSI-RS, and IM resources that are configured to support non-low latency CSI reporting. The non-low latency CSI-RS and/or IM resources may be configured according to a non-low latency pattern. In some examples, non-low latency ZP CSI-RS resources are configured to support the non-low latency CSI-RS and IM resources. In some examples, non-low latency CSI-RS and/or IM resources are configured with a periodicity that supports non-low latency communications. Other UEs may identify and rate match around the CSI-RS resources in downlink transmission 215 based on the periodicity.

In some cases, downlink transmission 215 may also include CSI-RS and IM resources that are configured to support non-low latency CSI reporting. The low latency CSI-RS and/or IM resources may be configured according to a low latency pattern. In some examples, low latency CSI-RS and/or IM resources are configured with a periodicity that supports low latency communications. Low latency ZP CSI-RS resources may also be configured to support the low latency CSI-RS and IM resources. In some cases, other UEs (e.g., legacy UEs) may be unaware of and fail to rate match around the low latency CSI-RS resources.

In some cases, low latency CSI-RS resources may use the same resources as the non-low latency CSI-RS since changes in channel conditions are minimal if a UE remains in a single location or area. When low latency CSI-RS resources use the same resources as the non-low latency CSI-RS resources, other UEs (e.g., legacy UEs) may rate match around both the low latency and non-low latency CSI-RS resources without explicitly being aware of the presence of the non-low latency CSI-RS resources.

In some cases, low latency IM resources may be configured with a higher periodicity than non-low latency IM resources to compensate for short-term, or bursty, interference caused by scheduling in neighboring cells. In some examples, the IM resources are configured with a periodicity that is based on transmissions using sTTIs 230. In some examples, the low latency IM resources are configured to at least partially overlap with the non-low latency IM resources. For example, the low latency IM resources may use the same resources as the non-low latency IM resources during subframes that carry non-low latency ZP CSI-RS. In this way, rate matching for UE 115-*a* may be facilitated during these subframes. In some examples, the low latency IM resources are configured during symbol periods 5-6, 9-10, or 12-13 to align with non-low latency IM resources. In some examples, the low latency IM resource patterns have a lower resource element density than the non-low latency IM resource patterns. And in some cases, the low latency IM resources use the same resources as the non-low latency IM resources.

In some examples, the low latency CSI-RS and/or IM resources are not configured according to a periodicity, but are dynamically scheduled and indicated (e.g., in DCI) in a sTTI 230. In some cases, the low latency CSI-RS and/or IM resources are scheduled to partially or completely overlap with the non-low latency CSI-RS and/or IM resources (e.g., the low latency CSI-RS and/or IM resources may be the same as the non-low latency CSI-RS and IM resources). For example, base station 105-*a* may indicate, in DCI, the presence of low latency CSI-RS and/or IM resources during a subframe. UE 115-*a* may identify the presence of the low latency CSI-RS and/or IM resources to determine CSI. Other UEs may also identify the presence of the low latency CSI-RS and/or IM resources based on the indication and rate match accordingly. In some examples, base station 105-*a* schedules the low latency CSI-RS and/or IM resources to overlap with non-low latency CSI-RS and IM resources. For instance, base station 105-*a* may schedule the low latency CSI-RS and/or IM resources in an sTTI 230 that includes the non-low latency CSI-RS. Base station 105-*a* may also trigger an aperiodic CSI report during the sTTI 230. And UE 115-*a* may calculate CSI based on the low latency CSI-RS and IM resources, while other UEs may rate match around the low latency CSI-RS and IM resources.

In some cases, UE 115-*a* may compute CSI for the low latency CSI reporting configuration or the non-low latency CSI reporting configuration, or both. In some cases, UE 115-*a* may compute size-limited CSI—CSI conveying less data than CSI for non-low latency reporting—or partial CSI for low latency CSI reporting. For example, UE 115-*a* may compute low latency CQI for increased subband sizes, relative to the subband sizes for non-low latency CQI. In another example, UE 115-*a* may exclude certain reporting types from being used, or include only certain reporting types, for low latency CSI reporting. For instance, UE 115-*a* may exclude reporting types that report wideband and narrowband PMI, and may support reporting types without PMI (e.g., reporting type 1-0, 2-0, and 3-0) or with single wide-band PMI (e.g., reporting type 1-1, 2-1, 3-1). UE 115-*a* may also utilize restricted codebooks for low latency CSI reporting.

In some cases, UE 115-*a* may compute CSI for low latency CSI reporting based on a CSI processing timeline. For instance, UE 115-*a* may compute larger or smaller CSI based on the amount of time available to compute CSI. In one example, UE 115-*a* may receive a trigger for reporting low latency CSI in a first TTI 225 or sTTI 230 (TTI n or sTTI n) and may be scheduled to transmit the low latency CSI report with uplink data over PUSCH resources during a following sTTI 230 (TTI n+4 or sTTI n+4). UE 115-*a* may compute a size-limited CSI report based on the interval between receiving the trigger and the scheduled PUSCH resources. In another example, UE 115-*a* may receive a trigger for reporting low latency CSI in a first TTI 225 or sTTI 230 (TTI n or sTTI n) without also being scheduled to transmit uplink data. UE 115-*a* may report the CSI according to the same interval as above i.e., during TTI n+4 or sTTI n+4—or UE 115-*a* may report the CSI using a longer interval—i.e., during n+6 TTI or sTTI n+6. UE 115-*a* may generate CSI of a larger size, relative to the size of the CSI generated when uplink data is transmitted with the CSI, based on more resources being available during the sTTI and/or the longer processing time associated with TTI n+6 or sTTI n+6.

In another example, UE 115-*a* may compute full or nearly full CSI, relative to non-low latency CSI, when asymmetric downlink and uplink sTTIs 230 are configured (e.g., {2,7}). For example, if uplink timing is based on the uplink sTTI 230 length, then UE 115-*a* may generate a larger CSI report (e.g., a full non-low latency CSI report) if a downlink sTTI 230 spans 2 symbol periods and an uplink sTTI 230 spans 7 symbol periods, than if the downlink sTTI 230 spans 2 symbol periods and the uplink sTTI 230 spans 2 symbol periods—i.e., due to a longer processing time between the downlink sTTI 230 and the larger uplink sTTI 230.

In some cases, the rate of low latency CSI reporting is based on the periodicity configured for periodic low latency CSI reporting—e.g., the periodicity may be high to support low latency communications. In other cases, the rate of low latency CSI reporting may be based on a triggering rate of aperiodic low latency CSI reporting—e.g., the triggering may be frequent to support low latency communications. For CSI-RS/IM resource based aperiodic CSI reporting, UE 115-*a* may refrain from computing CSI if the triggering rate of aperiodic low latency CSI reporting is higher than the periodicity of the CSI-RS and IM resources when no new reference signals are available for measuring between a first and second trigger.

Figure 3A:
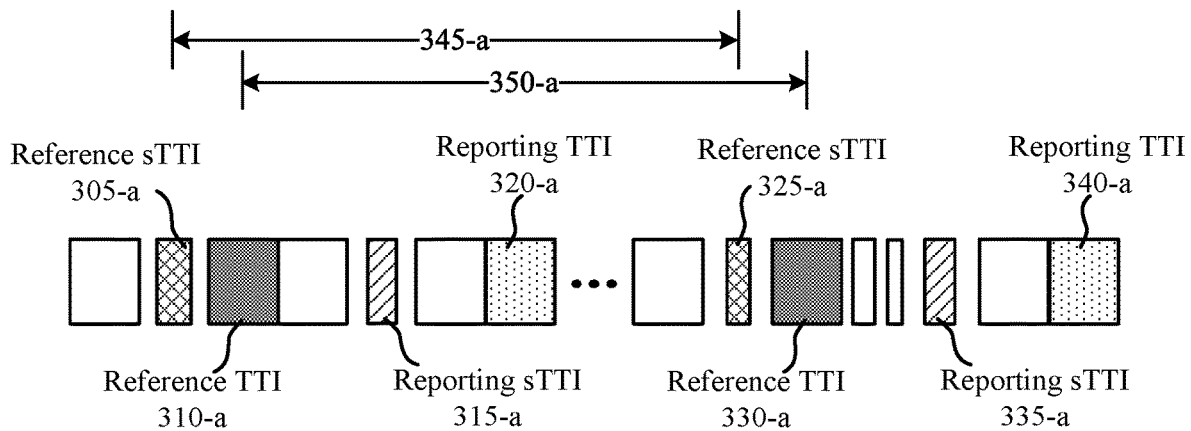
FIGS. 3A and 3B depicts CSI reporting for short TTIs in accordance with various aspects of the present disclosure.

FIG. 3A depicts example CSI reporting 300-*a* for short TTIs in accordance with various aspects of the present disclosure. CSI reporting 300-*a* may illustrate aspects of a transmission between a UE 115 and a base station 105, as described above with reference to FIGS. 1-2. CSI reporting 300-*a* may include sTTI reference resources, such as reference sTTIs 305-*a* and 325-*a*, TTI reference resources, such as reference TTI 310-*a* and reference TTI 330-*a*, sTTI reporting resources, such as reporting sTTI 315-*a* and reporting sTTI 335-*a*, and TTI reporting resources, such as reporting TTI 320-*a* and reporting TTI 340-*a*. CSI reporting 300-*a* may also include sTTI periodicity 345-*a* and TTI periodicity 350-*a*. In some cases, sTTI periodicity 345-*a* is shorter than TTI periodicity 350-*a*. In some cases, a first transmission mode is configured for non-low latency communications and a second transmission mode is configured for low-latency communications. In other cases, a same transmission mode is configured for both non-low latency and low latency communications.

The sTTI reference resources, or reference sTTIs, may be used to determine CSI for low latency communications. For instance, a UE may determine a modulation scheme and transport block size corresponding to the highest CQI index that provides a<0.1 probability error based on a transport block size for an sTTI. Reference sTTIs may vary in length, e.g., from 2 to 3 symbol periods. In some examples, reference sTTIs are periodically configured for a UE based on a provided periodicity and offset. Reference sTTIs may be downlink resources, such as a sTTI PDSCH resources.

The TTI reference resources, or reference TTIs, may be used to determine CSI for non-low latency communications. For instance, a UE may determine a modulation scheme and transport block size corresponding to the highest CQI index that provides a<0.1 probability error based on a transport block size for a TTI. Reference TTIs may be larger in size than reference sTTIs—e.g., reference TTIs may span 14 symbol periods, or a subframe. Though, in some cases, a reference sTTI may also span a full subframe. In some examples, reference TTIs are identified relative to periodically configured reporting resources for a UE. Reference TTIs may be downlink resources, such as PDSCH resources.

The sTTI reporting resources, or reporting sTTIs, may be reserved for the transmission of a low latency CSI report. Reporting sTTIs may be configured for a UE on a periodic basis based on a provided periodicity and offset. Reporting sTTIs may be uplink resources, such as sTTI PUSCH or PUCCH resources. A reporting sTTI may vary in length from 1 to 7 symbol periods. In some cases, uplink data may be transmitted with the low latency CSI report.

The TTI reporting resources, or reporting TTIs, may be reserved for the transmission of a non-low latency CSI report. Reporting TTIs may be configured for a UE on a periodic basis based on a provided periodicity and offset. Reporting TTIs may be uplink resources, such as PUSCH or PUCCH resources. In some cases, uplink data may be transmitted with the non-low latency CSI report.

In one example, a UE may be configured with a low latency CSI reporting configuration for sTTIs and a non-low latency CSI reporting configuration for TTIs. A base station using the low latency CSI reporting configuration may configure low latency CSI reporting resources for the UE, and the UE may identify CSI reference resources, such as reference sTTI 305-a and reporting sTTI 315-a, relative to the reporting resources. In some cases, the low latency CSI reporting configuration provides the UE with sTTI periodicity 345-a and an offset which the UE uses to determine the location of the low latency CSI reporting resources. The offset may indicate to the UE a location of a TTI or sTTI relative to a first TTI or sTTI in a subframe.

In some cases, the UE may identify reference sTTI 305-a and reference sTTI 325-a based on CSI reporting resources configured for the UE. The UE may generate a low latency CSI report based on reference sTTIs 305-a and 325-a. In some examples, reference sTTIs 305-a and 325-a span a full subframe, in which case, the UE may generate a low latency CSI report using an sTTI transport block size (e.g., 2 or 3 symbol periods). In some examples, the UE may determine that reference sTTI 305-a is an MBSFN subframe or an sTTI within an MB SFN subframe.

In other examples, reference sTTIs 305-a and 325-a span an sTTI (e.g., 2 or 3 symbol periods), in which case, the UE may generate the low latency CSI report based on a length of the reference sTTI. In some cases, the low latency CSI report is size-limited to accommodate timing and/or resource constraints. For instance, the low latency CSI report may be limited to certain CSI reporting types, such as CSI reporting types that include a single wideband PMI or do not report PMI at all. In another instance, the low latency CSI report may increase the size of subbands, relative to a non-low latency CSI report, for which CQI is reported.

The UE may similarly determine a location of reporting sTTIs 315-a and 335-a based on a provided periodicity and offset. The UE may transmit the low latency CSI report to the base station during reporting sTTIs 315-a and 335-a.

The base station may also configure non-low latency CSI reporting resources, such as reference TTI 310-a and reporting TTI 320-a, for the UE. In some cases, low latency CSI reporting and non-low latency CSI reporting configurations are configured for the UE as separate CSI processes. In some examples, the low latency CSI reporting process and non-low latency CSI reporting process are uniquely indexed, and thus may be updated separately. For example, the UE 115 may update N of the lowest-indexed low latency CSI processes (e.g., when a low latency CSI trigger is received), where $N=\max(N_x-N_u, 0)$, $N_{CSI-P}$ is the maximum number of supported low latency CSI processes, and $N_u$ is the number of unreported low latency CSI processes. The UE may separately update CSI for a non-low latency CSI process based on whether an index assigned to the non-low latency CSI process is one of N lowest-indexed non-low latency CSI processes (e.g., when a non-low latency CSI trigger is received), where $N=\max(N_x-N_u, 0)$, $N_{CSI-P}$ is the maximum number of supported non-low latency CSI processes, and $N_u$ is the number of unreported non-low latency CSI processes. In other examples, the low latency CSI reporting process and non-low latency CSI reporting process are jointly indexed, and thus may be updated concurrently.

The UE may determine the location of the non-low latency CSI reporting resources based on TTI periodicity 350-a and an offset. In some cases, UE may determine that reference TTIs 310-a and 330-a are CSI reference resources and that reporting TTI 320-a and 340-a are CSI reporting resources. The UE may generate CSI based on reference TTIs 310-a and 330-a and may report the CSI during reporting sTTIs 315-a and 335-a.

Figure 3B:
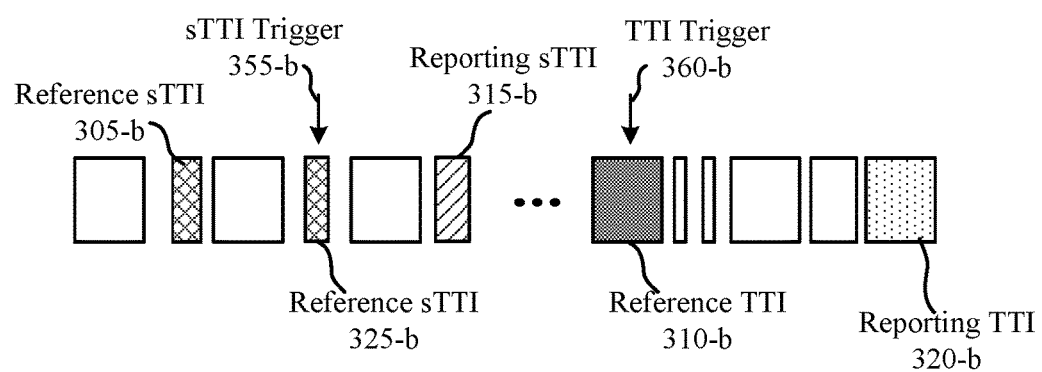

FIG. 3B illustrates an example of CSI reporting 300-b for short TTIs in accordance with various aspects of the present disclosure. CSI reporting 300-b may illustrate aspects of a transmission between a UE 115 and a base station 105, as described above with reference to FIGS. 1-2. CSI reporting 300-b may include sTTI reference resources, such as reference sTTIs 305-b and 325-b, TTI reference resources, such as reference TTIs 310-b, sTTI reporting resources, such as reporting sTTIs 315-b, and TTI reporting resources, such as reporting TTIs 320-b. CSI reporting 300-b may also include CSI reporting triggers, such as sTTI trigger 355-b and TTI trigger 360-b.

The sTTI reference resources, TTI reference resources, sTTI reporting resources, and TTI reporting resources may share the same or similar capabilities with the sTTI reference resources, TTI reference resources, sTTI reporting resources, and TTI reporting resources as discussed with reference to FIG. 3A.

In one example, a UE may be configured to report low latency CSI on an aperiodic basis—e.g., based on receiving a CSI reporting trigger. The UE may also be configured to report non-low latency CSI on an aperiodic basis. In some cases, the low latency and non-low latency CSI reporting configurations are triggered separately. For instance, separate triggers, such as sTTI trigger 355-b and TTI trigger 360-b, may be defined for the low latency and non-low latency CSI reporting configurations. Or a single trigger may include a field that requests that CSI for one of the CSI configurations is reported. In other cases, the low latency and non-low latency CSI reporting configurations are triggered jointly. For instance, a single trigger may cause the UE to report both low latency and non-low latency CSI. In some cases, the trigger includes a field that requests that CSI for both of the CSI configurations is reported.

The UE may receive sTTI trigger 355-*b* in an sTTI resource. In some cases, the UE may also identify that the sTTI resource that carried the sTTI trigger is a reference sTTI 325-*b* for CSI reporting. In other cases, the UE may identify that a previous resource, such as reference sTTI 305-*b* is a reference resource for CSI reporting. In some cases, reference sTTIs 305-*b* and/or 325-*b* span a full subframe. In some cases, reference sTTIs 305-*b* and/or 325-*b* are MBSFN subframes or sTTIs in an MBSFN subframe. The UE may generate a low latency CSI report based on receiving sTTI trigger 355-*b*. In some cases, a size of the low latency CSI report is based on timing and/or resource considerations. For instance, a size of the low latency CSI report may be reduced, relative to a non-low latency CSI report, if the time between receiving the trigger and reporting the CSI is short (e.g., less than a millisecond). In another instance, a size of the low latency CSI report may be reduced, relative to a non-low latency CSI report, if the CSI report is to be transmitted with uplink data. In some cases, a size of the low latency CSI report may be increased, or the same as a non-low latency CSI report, if the CSI report is to be transmitted without uplink data.

The UE may report the low latency CSI report during reporting sTTI 315-*b*. In some examples, reporting sTTI 315-*b* spans two or three symbol periods. In other examples, reporting sTTI 315-*b* spans seven symbol periods. In some cases, the low latency CSI report is generated based on a length of reporting sTTI 315-*b* or 335-*b*. For instance, a size of the low latency CSI report may be reduced if the length of reporting sTTI 315-*b* is two or three symbol periods. In another instance, a size of the low latency CSI report may be a full CSI report—e.g., may be the same size as a non-low latency CSI report—if the length of reporting sTTI 315-*b* is seven symbol periods.

The UE may also receive TTI trigger 360-*b* and prepare a non-low latency CSI report. In some cases, the UE prepares the non-low latency CSI report based on reference TTI 310-*b*. The UE may transmit the non-low latency CSI report in reporting TTI 320-*b*. In some cases, reporting TTI 320-*b* occurs four milliseconds after TTI trigger 360-*b* is received.

Figure 4:
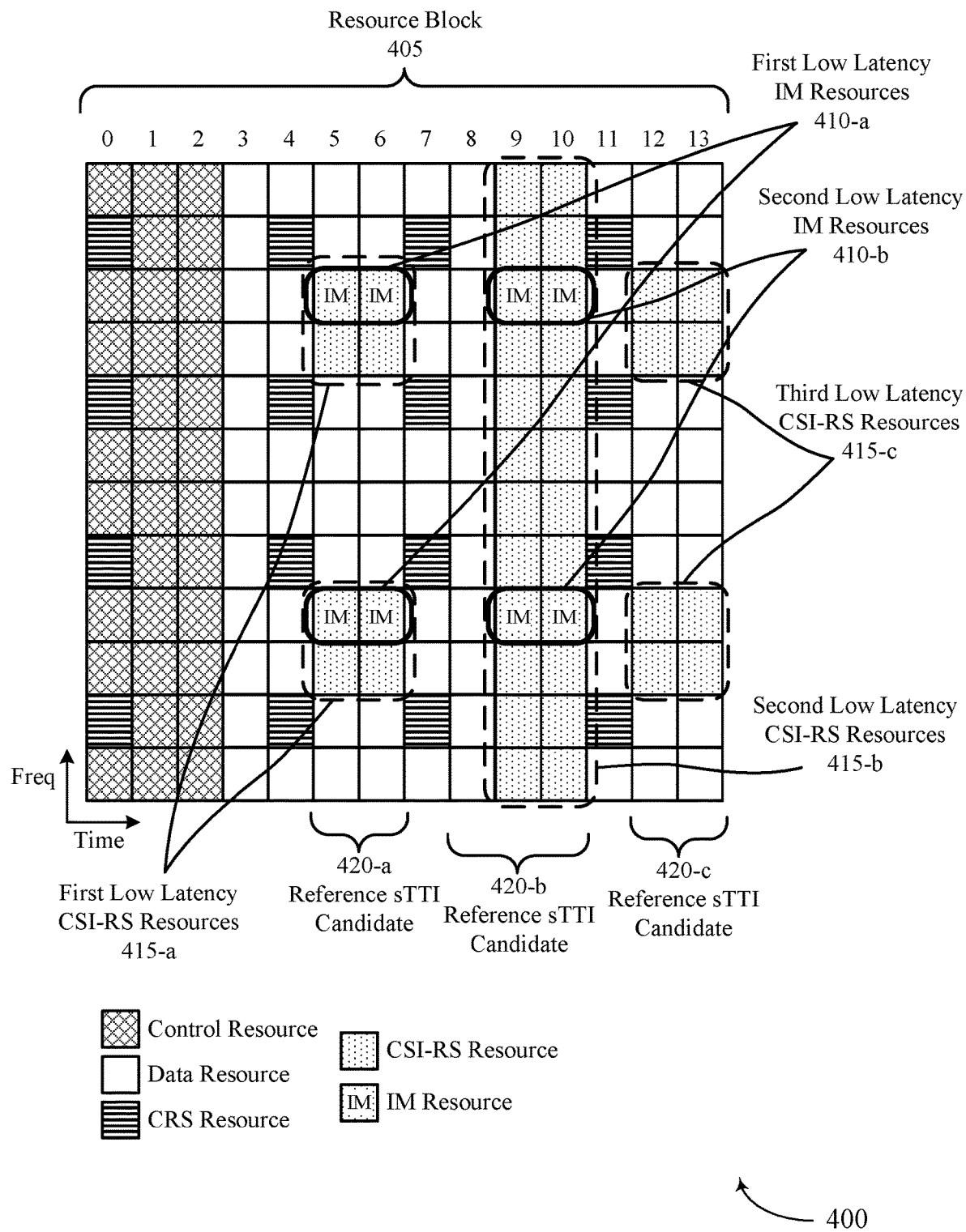
FIG. 4 illustrates an example of a reference signal configuration that supports reporting CSI for short TTIs in accordance with various aspects of the present disclosure.

FIG. 4 illustrates an example of a reference signal configuration 400 that supports reporting CSI for short TTIs in accordance with various aspects of the present disclosure. Reference signal configuration 400 may include resource block 405, which may include control resources, data resources, CRS resources, CSI-RS resources, and IM resources. Reference signal configuration 400 may also include first low latency IM resources 410-*a* and second low latency IM resources 410-*b*, first low latency CSI-RS resources 415-*a*, second low latency CSI-RS resources 415-*b*, third low latency CSI-RS resources 415-*c*, and reference sTTI candidate 420-*a* to 420-*c*.

Resource block 405 may be configured as a non-low latency resource block—e.g., resource block 405 may be configured for a 1 ms TTI and may include 14 symbol periods, which may be labeled from 0 to 13. Resource block 405 may also span 12 subcarriers in the frequency domain. Resource block may include control resources, data resources, CRS resources, CSI-RS resources, and IM resources. In some cases, a resource block carrying CRS, CSI-RS, and/or IM resources, like resource block 405, may be transmitted periodically to support non-low latency communications (e.g., every 5 ms).

The control resources may convey configuration information, such as transmit power control (TPC) commands and resource block allocation information. The data resources may convey user data. The CRS resources may carry common reference signals, which may be used to determine channel estimates (e.g., determine an SNR) and interference estimates and may be used for CSI reporting. The CSI-RS resources may carry CSI-specific reference signals, which may also be used to determine channel estimates—since CSI-RS occupy resources usually occupied by data resources channel estimates using CSI-RS may provide higher accuracy channel estimates for data transmission—and interference estimates and used for CSI reporting. In some cases, one or more of the CSI-RS resources may be configured as ZP CSI-RS resources. A UE may determine that resource elements that have been configured as ZP CSI-RS resources are allocated for a purpose other than for CSI reporting (e.g., for interference measurements) and may refrain from decoding and rate match around the resource element.

IM resources may be designated during resource block 405 to measure interference caused by neighboring base stations. For instance, a base station may refrain from transmitting a signal over a resource that has been designated as an IM resource and the signal measured by a UE over that resource may represent interference from nearby base stations. In some cases, ZP CSI-RS resources are configured to support IM resources. For instance, ZP CSI-RS resources may be configured in one or more of the resources designated as IM resources.

In one example, a base station configures low latency CSI-RS and/or IM resources to support low latency CSI reporting. For example, the base station may configure additional low latency CSI-RS and/or IM resources to support low latency CSI reporting. In some cases, low latency CSI-RS and/or IM resources may be configured with a higher periodicity than non-low latency CSI-RS/IM resources to compensate for short-term interference (e.g., interference that last 1-2 symbol periods). The base station may also configure additional low latency ZP CSI-RS resources based on the low latency NZP CSI-RS/IM resources.

In some examples, the base station configures low latency CSI-RS resources 415 and low latency IM resources 410 based on the non-low latency CSI-RS and IM resource configuration depicted in FIG. 4. In some examples, the base station configures the low latency CSI-RS resources to overlap with the non-low latency CSI-RS resources. For instance, the base station may configure low latency CSI-RS resources to occupy all the same resources as the non-low latency CSI-RS resources since short-term changes in a channel are often minimal when a UE remains stationary or within a small area. For example, the base station may configure low latency CSI-RS resources 415 to use the same resource as the non-low latency CSI-RS resources in resource block 405.

The base station may also configure low latency IM resources to partially overlap with the non-low latency IM resources, but may not configure low latency IM resources to occupy all the same resources as the non-low latency IM resources since interference from neighboring cells may change rapidly (e.g., within 1-2 symbol periods). In some examples, base station may configure low latency IM resources 410 to use the same resources as the non-low latency IM resources in resource blocks that carry non-low latency IM resources, such as resource block 405. By scheduling low latency CSI-RS and/or IM resources to overlap with one or more non-low latency CSI-RS and/or IM resources, a non-low latency UE may rate match around low latency CSI-RS and/or IM resources while being unaware of their presence.

In some examples, a base station may dynamically schedule low latency CSI-RS and/or IM resources and may indicate a location of the low latency CSI-RS and/or IM resources. In some cases, the base station may indicate the location of the low latency CSI-RS and/or IM resources in DCI that may be transmitted in the control resources. As above, the base station may schedule the low latency CSI-RS resources 415 and low latency IM resources 410 to completely overlap with the non-low latency CSI-RS and/or IM resources when the base station schedules the low latency CSI-RS and/or IM resources during a resource block that conveys non-low latency CSI-RS and IM resources, such as resource block 405.

In some examples, a base station may schedule low latency CSI-RS and/or IM resources on a semi-persistent basis. For instance, the base station may indicate a location of the low latency CSI-RS and/or IM resources in a first subframe along with a periodicity indicating a location of the low latency CSI-RS and/or IM resources in subsequent subframes. In some cases, the base station may indicate the location of the CSI-RS and IM resources, a periodicity for the CSI-RS and IM resources in DCI. The base station may also send an activation or deactivation message for the semi-persistent scheduled CSI-RS and IM resources. In some cases, the semi-persistent scheduled CSI-RS and IM resources may deactivated when after a certain amount of time, which may also be indicated in DCI, has passed. The UE may identify the low latency CSI-RS and/or IM resources in a first subframe based on receiving the semi-persistent CSI-RS and/or IM resource trigger and may identify subsequent low latency CSI-RS and/or IM resources in subsequent subframes based on a periodicity received in DCI. In some cases, the UE may continue to identify subsequent low latency CSI-RS and/or IM resources until a trigger deactivating the semi-persistent scheduled low latency CSI-RS and/or IM resources is received (e.g., from a base station or based on a corresponding timer expiring).

As also discussed, a base station may map low latency CSI-RS and/or IM resources to non-low latency CSI-RS and/or IM resources when non-low latency CSI-RS and/or IM resources are configured for a subframe. The base station may then configure one or more sTTIs based on the mapping. For example, base station may identify reference sTTI candidate 420-a and reference sTTI candidate 420-b. As shown in FIG. 4, reference sTTI candidate 420-a spans two symbol periods (e.g., covers symbol periods 5 and 6) and includes first low latency CSI-RS resources 415-a and low latency IM resources 410-a that are mapped to one or more of non-low latency CSI-RS and IM resources. While reference sTTI candidate 420-a spans three symbol periods (e.g., covers symbol periods 8-10) and includes second low latency CSI-RS resources 415-b and second low latency IM resources 410-b that are mapped to one or more of non-low latency CSI-RS and IM resources. In some cases, reference sTTI candidate 420-c, covering symbol periods 12 and 13, may include third low latency CSI-RS resources 415-c, but may not include any low latency IM resources. In some cases, reference sTTI candidate 420-c may not be configured as, or identified, as a reference resource for CSI reporting.

Figure 5:
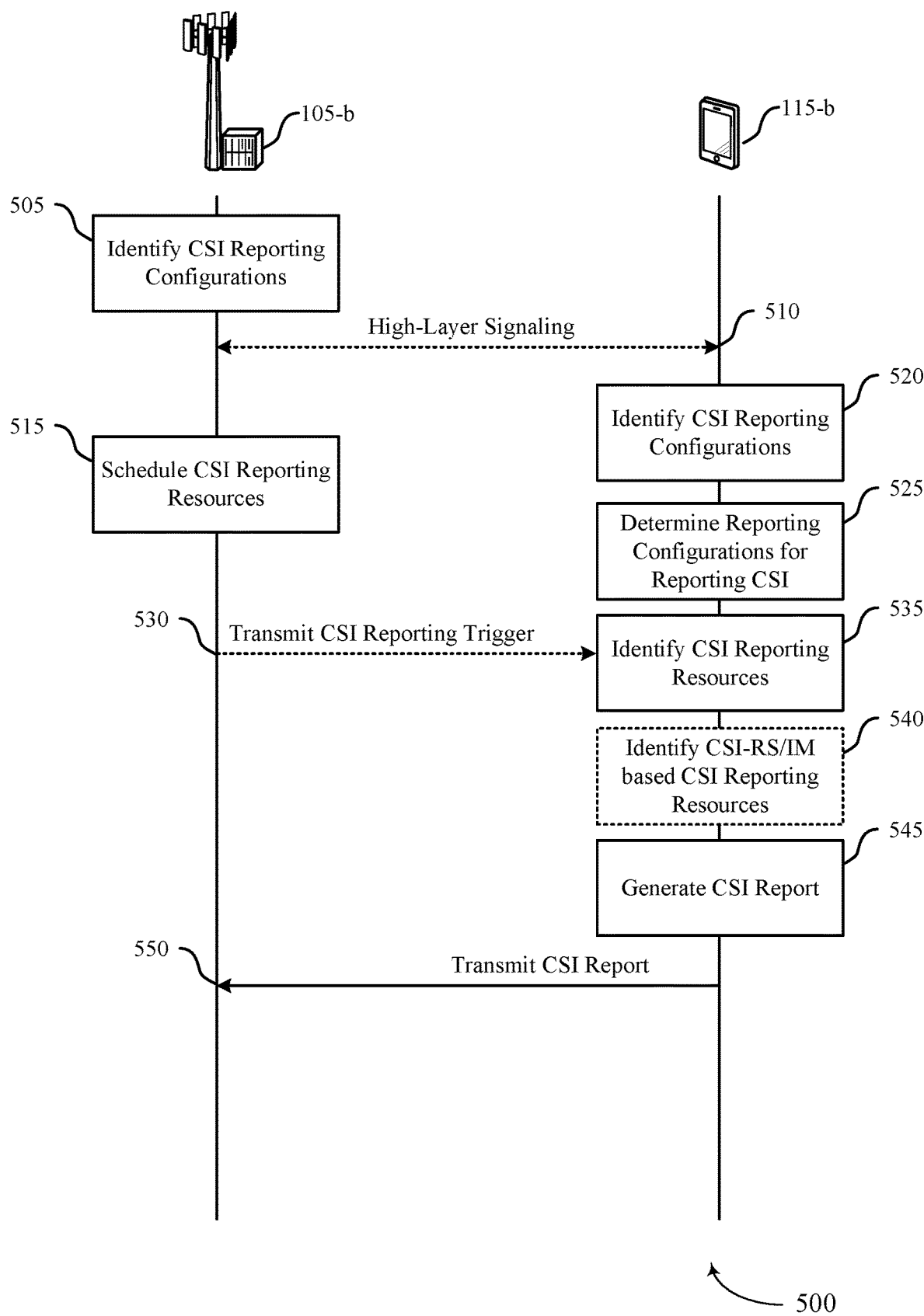
FIG. 5 illustrates an example of a process flow for CSI reporting for short TTIs in accordance with various aspects of the present disclosure.

FIG. 5 illustrates an example of a process flow 500 for CSI reporting for short TTIs in accordance with various aspects of the present disclosure. Process flow 500 may be performed by UE 115-b and base station 105-b, which may be an example of a UE 115 and base station 105 described above with reference to FIGS. 1-2. In some examples, a base station, such as base station 105-b, and a UE, such as UE 115-b, may configure and report CSI for long TTIs, short TTIs, or both.

At step 505, base station 105-b may identify one or more CSI reporting configurations for UE 115-b. In some examples, base station 105-b may identify a low latency CSI reporting configuration and a non-low latency CSI reporting configuration. In some cases, base station 105-b may determine a first periodicity and offset for low latency CSI reporting resources and a second periodicity and offset for low latency CSI reporting resources configured for UE 115-b At step 510, base station 105-b and UE 115-b may exchange high-layer signaling (e.g., RRC signaling). For instance, UE 115-b may signal to base station 105-b a capability for communicating using short TTIs, and base station 105-b may send configuration information, such as CSI reporting configuration information, to UE 115-b. In some cases, base station 105-b establishes a first RRC configuration for low latency CSI reporting and a second RRC configuration for non-low latency CSI reporting with UE 115-b. In some cases, the low latency CSI reporting configuration corresponds to a low latency CSI process and the non-low latency CSI reporting configuration corresponds to a separate CSI process. In some examples, the low latency CSI process is assigned a separate index from the non-low latency CSI process and is updated independently from the non-low latency CSI process when a CSI trigger is received. In other examples, the low latency CSI process is assigned a common index from the non-low latency process and is updated concurrently when a CSI trigger is received.

At step 515, base station 105-b may configure CSI reporting resources for UE 115-b. In some cases, base station 105-b may configure low latency CSI reporting resources for UE 115-b based on the first periodicity and offset. Base station 105-b may also configure reference signal resources, such as CRS and low latency CSI-RS, and low latency IM resources. In some cases, base station 105-b schedules the low latency reference signal resources and IM resources according to another periodicity. In other cases, base station 105-b schedules the low latency reference signal resources and IM resources dynamically, and indicates the presence of the low latency resources in DCI.

At step 520, UE 115-b may identify a low latency CSI reporting configuration and a non-low latency CSI reporting configuration. In some cases, the CSI reporting configuration may provide CSI reporting configuration information, such as a periodicity and offset, for low latency and non-low latency CSI resources. In some cases, the CSI reporting configuration may indicate that aperiodic CSI reporting is configured for one or both of the CSI reporting configurations. UE 115-b may also determine whether the low latency and non-low latency CSI reporting configurations are defined as separate processes, and whether the CSI processes are triggered jointly or independently.

At step 525, UE 115-b may determine which reporting configurations are active for reporting CSI. For example, UE 115-b may determine that a low latency CSI reporting configuration has been enabled or a non-low latency CSI reporting configuration has been enabled, or both. In some cases, UE 115-*b* may determine that the low latency CSI reporting configuration corresponds to a first CSI process and the non-low latency CSI reporting configuration corresponds to a second CSI process.

At step 530, base station 105-*b* may transmit a CSI reporting trigger. In some cases, base station 105-*b* transmits the CSI reporting trigger to aperiodically schedule UE 115-*b* to report CSI. In some examples, base station 105-*b* transmits a single trigger that triggers both low latency and non-low latency CSI reporting. In some cases, the trigger is configured with a field that requests low latency CSI reporting (e.g., by signaling 00) or non-low latency CSI reporting (e.g., by signaling 01), or both (e.g., by signaling 10). In other examples, base station 105-*b* transmits one trigger for low latency CSI reporting and a different trigger for non-low latency CSI reporting.

At step 535, UE 115-*b* may identify CSI reporting resources, such as CSI reference resources, CSI reporting resources, and reference signals that support CSI reporting (e.g., CRS, CSI-RS). UE 115-*b* may also identify IM resources for measuring interference from nearby base stations. In some cases, UE 115-*b* identifies the CSI reporting resources based on the received first periodicity and offset and the CSI reference resources relative to the location of the CSI reporting resources. In some examples, UE 115-*b* may identify the CSI reporting resources and reference resources relative to a received trigger or scheduled reporting resource. For instance, the reference resources may be offset from the trigger or reporting resource by 4 milliseconds, and the reference resources may be included in the TTI or sTTI in which the trigger was received. Or the reference resources may precede a scheduled reporting resource, $n_{CSI}$, by a certain number of sTTIs or TTIs, $n_{CQI}$.

At step 540, UE 115-*b* may also identify one or more reference signal resources that support CSI reporting based on a known reference signal pattern. In some cases, UE 115-*b* only identifies CSI-RS and IM resources for CSI reporting for certain transmission modes (e.g., TM 9, TM 10, or an FD-MIMO TM). In some cases, UE 115-*b* may determine that low latency reference signal resources with their own periodicity and offsets have been configured for sTTI communications. In other cases, UE 115-*b* may determine that low latency reference signal resources overlap with non-low latency reference signal resources. For example, UE 115-*b* may determine that low latency CSI-RS resources are the same as non-low latency CSI-RS resources, and that low latency IM resources are the same as non-low latency IM resources when an sTTI covers symbol periods that are otherwise scheduled to carry non-low latency IM resources. In some cases, UE 115-*b* may identify the one or more reference signal resources based on receiving an indication that an sTTI includes low latency CSI-RS and IM resources. In some examples, the indicated low latency CSI-RS and/or IM resources may be mapped to non-low latency CSI-RS and/or IM resources when an sTTI covers non-low latency CSI-RS and IM resources.

At step 545, UE 115-*b* may generate a CSI report based on the identified CSI reference resources and/or the identified CSI-RS/IM resources. In some cases, UE 115-*b* generates a reduced-size CSI report for low latency CSI reporting, relative to a CSI report generated for non-low latency CSI reporting. UE 115-*b* may generate a reduced low latency CSI reporting by reporting CSI for fewer subbands than for a non-low latency CSI report—e.g., by reporting for wider subbands. UE 115-*b* may also generate a reduced low latency CSI report by limiting the CSI report to certain types. For example, UE 115-*b* may exclude CSI reports that include both wideband and narrowband PMI. Or UE 115-*b* may use restricted PMI codebooks when generating a reduced low latency CSI report.

In some cases, UE 115-*b* may generate a low latency CSI report based on whether uplink data is scheduled to be transmitted with the CSI report. For example, for aperiodic CSI reporting if the low latency CSI report is scheduled to report CSI with uplink data, UE 115-*b* may generate a reduced-size low latency CSI report as discussed above. But if the low latency CSI report is scheduled to report CSI without uplink data, UE 115-*b* may generate a larger-sized low latency CSI report—e.g., larger relative to the reduced-size low latency CSI report or the same size as a non-low latency CSI report. In some examples, the low latency CSI reporting resource is scheduled to be transmit during a low latency CSI reporting resource that is time offset from an aperiodic trigger. In some cases, UE 115-*b* generates a larger-sized low latency CSI report if the time offset by a longer amount. UE 115-*b* may also generate a larger-sized low latency CSI report if there is a size imbalance between a downlink sTTI and an uplink sTTI used for reporting the low latency CSI.

At step 550, UE 115-*b* may transmit the CSI report to base station 105-*b*, and base station 105-*b* may receive the CSI report. In some cases, UE 115-*b* may transmit a low latency CSI report during a determined low latency CSI reporting resource.

Figure 6:
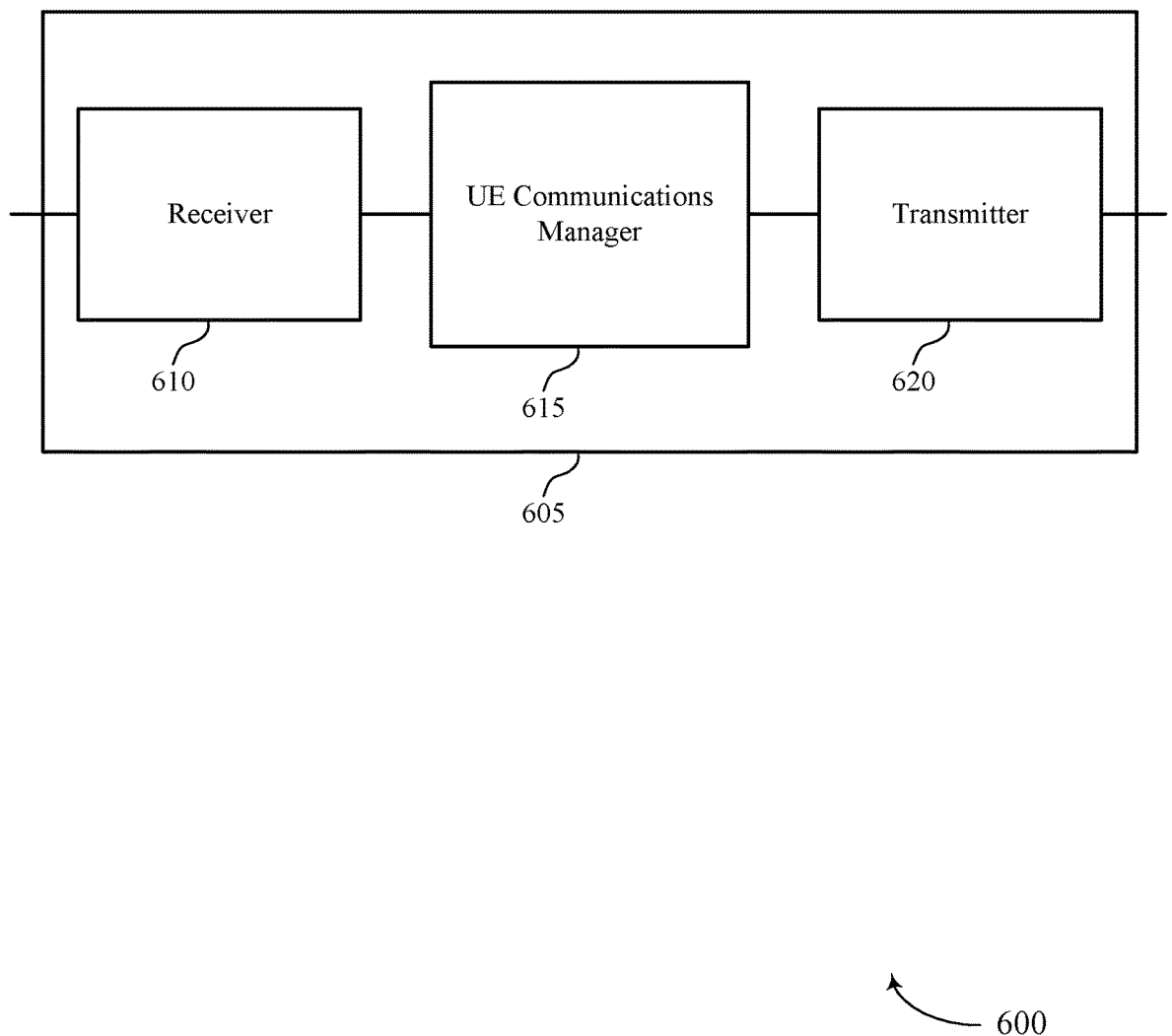
FIGS. 6 and 7 illustrate block diagrams of a device that supports CSI reporting for short TTIs in accordance with aspects of the present disclosure.

FIG. 6 illustrates a block diagram 600 of a wireless device 605 that supports CSI reporting for short TTI in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to CSI reporting for short TTIs, etc.). Information may be passed on to other components of the device. The receiver 610 may be an example of aspects of the transceiver 835 described with reference to FIG. 8. The receiver 610 may utilize a single antenna or a set of antennas.

Receiver 610 may receive a first downlink transmission over a first downlink resource of a third duration, receive a second downlink transmission over a second downlink resource of the third duration, and receive a set of downlink transmissions over a set of downlink resources of a third duration, where the set of downlink transmissions are associated with an uplink transmission of a fourth duration.

UE communications manager 615 may be an example of aspects of the UE communications manager 815 described with reference to FIG. 8. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify a first CSI reporting configuration associated with TTIs of a first duration, identify a second CSI reporting configuration associated with TTIs of a second duration that is shorter than the first duration, and determine whether to report CSI for the first CSI reporting configuration or the second CSI reporting configuration, or both.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas. Transmitter 620 may transmit a CSI report in accordance with the determination. In some cases, the CSI report and data are transmitted according to a first interval. In some cases, the CSI report is transmitted according to a second interval that is as long as, or longer than, the first interval.

Figure 7:
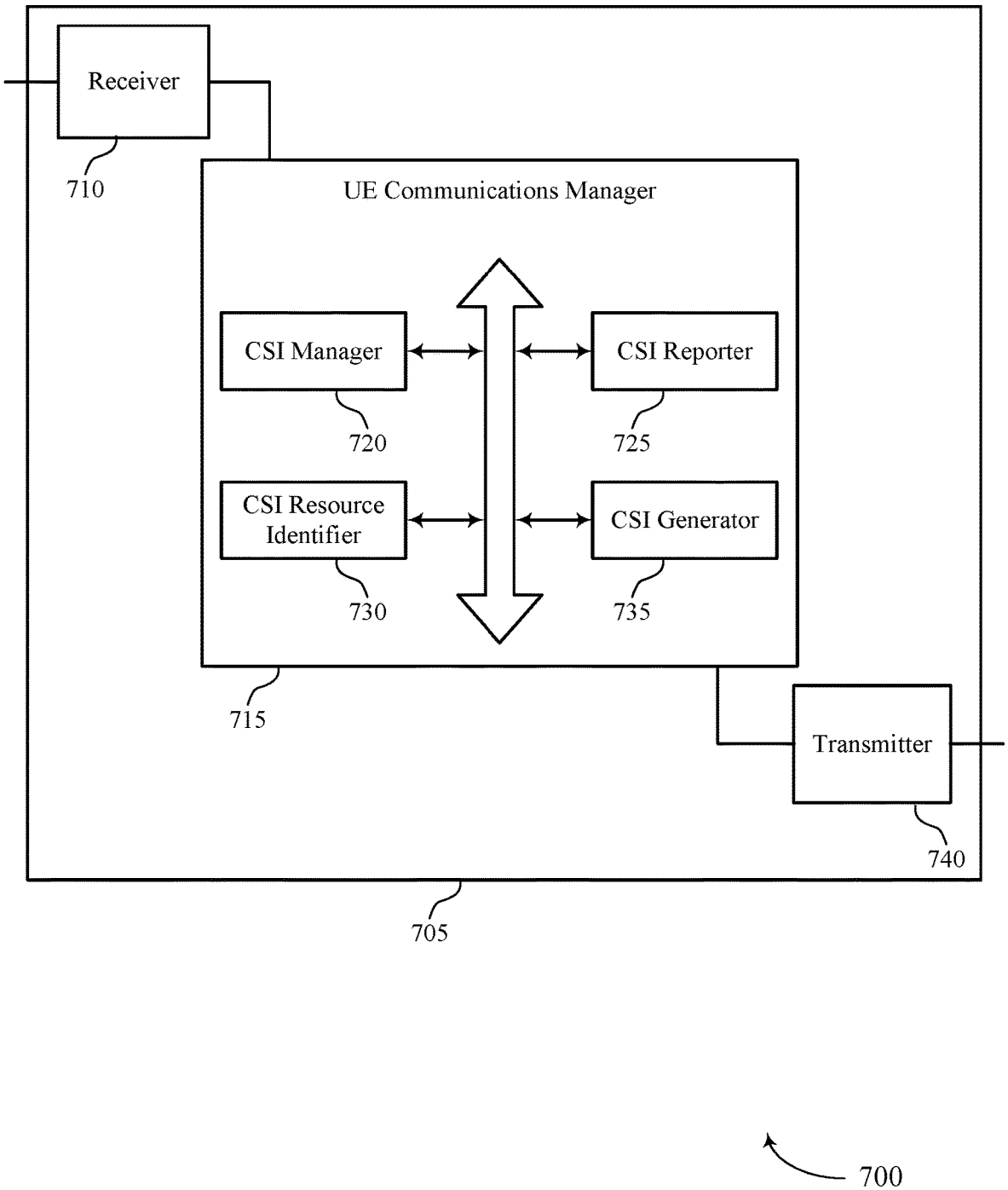

FIG. 7 illustrates a block diagram 700 of a wireless device 705 that supports CSI reporting for short TTIs in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 740. Wireless device 705 may also include a processor. Each of these components may be in communication with one another (e.g., via one or more buses).

Receiver 710 may receive information such as packets, user data, or control information associated with various information channels (e.g., control channels, data channels, and information related to CSI reporting for short TTIs, etc.). Information may be passed on to other components of the device. The receiver 710 may be an example of aspects of the transceiver 835 described with reference to FIG. 8. The receiver 710 may utilize a single antenna or a set of antennas.

UE communications manager 715 may be an example of aspects of the UE communications manager 815 described with reference to FIG. 8. UE communications manager 715 may include CSI manager 720, CSI reporter 725, CSI resource identifier 730, and CSI generator 735. Each of these modules may communicate, directly or indirectly, with one another (e.g., via one or more buses).

CSI manager 720 may identify a first CSI reporting configuration associated with TTIs of a first duration and a second CSI reporting configuration associated with TTIs of a second duration that is shorter than the first duration. CSI resource identifier 730 may identify, from either the TTIs of the first duration or the TTIs of the second duration, at least one reference resource for determining CSI. CSI reporter 725 may determine whether to report CSI for the first CSI reporting configuration or the second CSI reporting configuration, or both. And transmitter 740 may transmit a CSI report in accordance with the determination.

CSI manager 720 may receive a request for the CSI report during a first TTI of the first duration, where the request may schedule a reporting resource, and CSI resource identifier 730 may identify the at least one reference resource by identifying a second TTI of the first duration. In some cases, CSI resource identifier 730 identifies the second TTI of the first duration based on determining to report CSI for the second CSI reporting configuration, where the second TTI is identified relative to the reporting resources. In some cases, CSI resource identifier 730 may identify the at least one reference resource by identifying a second TTI of the second duration. CSI resource identifier 730 may identify the second TTI of the second duration based at least in part on determining to report CSI for the second CSI reporting configuration, where the second TTI includes the at least one reference resource and occurs during the first TTI. CSI manager 720 may also receive a request for the CSI report during a first TTI of the first duration, and CSI resource identifier 730 may identify the at least one reference resource by identifying a second TTI of the second duration based on determining to report CSI for the second CSI reporting configuration, where the second TTI includes the at least one reference resource and occurs before the first TTI in time. In some cases, CSI manager 720 identifies a request for the CSI report in one downlink transmission of the set of downlink transmissions.

CSI manager 720 may also associate a first CSI process with the first CSI reporting configuration and a second CSI process with the second CSI reporting configuration. In some cases, the request is received in a third TTI of the second duration that occurs during the first TTI. In some cases, the first CSI process is operated independently from the second CSI process. In some cases, the first CSI process for the first CSI reporting configuration is triggered independently from the second CSI process for the second CSI reporting configuration. In some cases, the first CSI process for the first CSI reporting configuration is associated with a first periodicity and a first offset, and where the second CSI process for the second CSI reporting configuration is associated with a second periodicity and a second offset. In some cases, the first CSI process is operated jointly with the second CSI process.

CSI resource identifier 730 may also identify the at least one reference resource by identifying a TTI of the first duration based on determining to report CSI for the second CSI reporting configuration, where the TTI includes the at least one reference resource. In some cases, CSI resource identifier 730 may receive configuration information including a first periodicity, a second periodicity, a first offset, and a second offset, and may identifying the at least one reference resource by identifying, for the first CSI reporting configuration, a first set of TTIs of the first duration based on the first periodicity and the first offset. In some cases, CSI resource identifier 730 may identify the at least one reference resource by identifying an MBSFN subframe based on determining to report CSI for the second CSI reporting configuration, where the MBSFN subframe includes the at least one reference resource. CSI resource identifier 730 may identify a second set of reference signals during a TTI that is before the MBSFN subframe in time, and CSI generator 735 may generate CSI for the second CSI reporting configuration based on the second set of reference signals. In some cases, the second set of reference signals are located within a predetermined time period relative to the MB SFN subframe, the predetermined time period based at least in part on a TTI of the second duration. CSI resource identifier 730 may also identify, for the second CSI reporting configuration, a second set of TTIs of the first duration based on the second periodicity and the second offset.

CSI resource identifier 730 may also identify a first pattern of first NZP reference signal resources and first interference measurement (IM) resources for the first CSI reporting configuration, where the first pattern is associated with a first periodicity and a first offset. CSI resource identifier 730 may also determine a second pattern of second NZP reference signal resources and second IM resources for the second CSI reporting configuration, where the second pattern is associated with a second periodicity and a second offset. In some cases, the second periodicity is higher than the first periodicity. In some cases, the first IM resources overlap with the second IM resources. CSI resource identifier 730 may also determine a third pattern of zero power (ZP) reference signal resources based on the first pattern. In some cases, TTI of the second duration comprises one or more NZP reference signal resources of the subset of the first NZP reference signal resources and one or more IM resources of the subset of the first IM resources. In some cases, the one or more NZP reference signal resources for the second reporting configuration overlap with the one or more NZP reference signal resources of the subset of the first NZP reference signal resources. And in some cases, the one or more IM resources for the second CSI reporting configuration overlap with the one or more IM resources of the subset of the first IM resources.

In some cases, the first NZP reference signal resources overlap with the second NZP reference signal resources. In some cases, a resource element density of the second pattern is lower than a resource element density of the first pattern. In some cases, CSI resource identifier 730 may receive an indication of a presence of one or more NZP reference signal resources and one or more IM resources for the second CSI reporting configuration in a TTI of the first duration, where the TTI of the first duration includes a subset of the first NZP reference signal resources and the first IM resources of the first pattern. In some cases, a TTI of the second duration includes one or more of the first NZP reference signal resources and first IM resources of the subset, and one or more NZP reference signal resources and the one or more IM resources for the second CSI reporting configuration overlap with the one or more first NZP reference signal resources and first IM resources of the subset.

CSI resource identifier 730 may identify an uplink resource of a third duration. In some cases, CSI resource identifier 730 may also identify an uplink resource of a fourth duration that is greater than the third duration.

CSI generator 735 may generate CSI for the second CSI reporting configuration based on the second duration, where the CSI report includes the CSI generated in accordance with the second CSI reporting configuration. CSI generator 735 may also generate CSI of a second size, greater than the first size, for the second CSI reporting configuration, generate a first CSI report for the first CSI process or a second CSI report for the second CSI process, or both, where the CSI report includes the first CSI report or the second CSI report, or both. CSI generator 735 may also generate first CSI for the first CSI reporting configuration and second CSI for the second CSI reporting configuration, where a size of the first CSI is greater than a size of the second CSI. CSI generator 735 may also generate the CSI report including the first CSI or the second CSI, or both. CSI generator 735 may also generate CSI for the second CSI reporting configuration based on the first set of reference signals in a control region, where the MBSFN subframe includes the control region having a first set of reference signals and a data region lacking reference signals.

In some cases, generating the first CSI includes determining the first CSI according to one of a set of reporting modes, and generating the second CSI includes determining the second CSI according to a subset of the set of reporting modes. CSI generator 735 may also receive uplink data for transmission with the CSI report, where second CSI of the second size for the second CSI reporting configuration is generated based on the uplink data.

CSI generator 735 may also generate third CSI for the second CSI reporting configuration based on a lack of uplink data for transmission, where a size of the third CSI is the same, or greater than, a size of the second CSI. CSI generator 735 may generate CSI of a first size for the second CSI reporting configuration, and generate the first CSI includes determining first CQI for at least one subband of a first size, and where generating the second CSI includes determining second CQI for at least one subband of a second size that is larger than the first size.

Transmitter 740 may transmit signals generated by other components of the device. In some examples, the transmitter 740 may be collocated with a receiver 710 in a transceiver module. For example, the transmitter 740 may be an example of aspects of the transceiver 835 described with reference to FIG. 8. The transmitter 740 may utilize a single antenna or a set of antennas.

Figure 8:
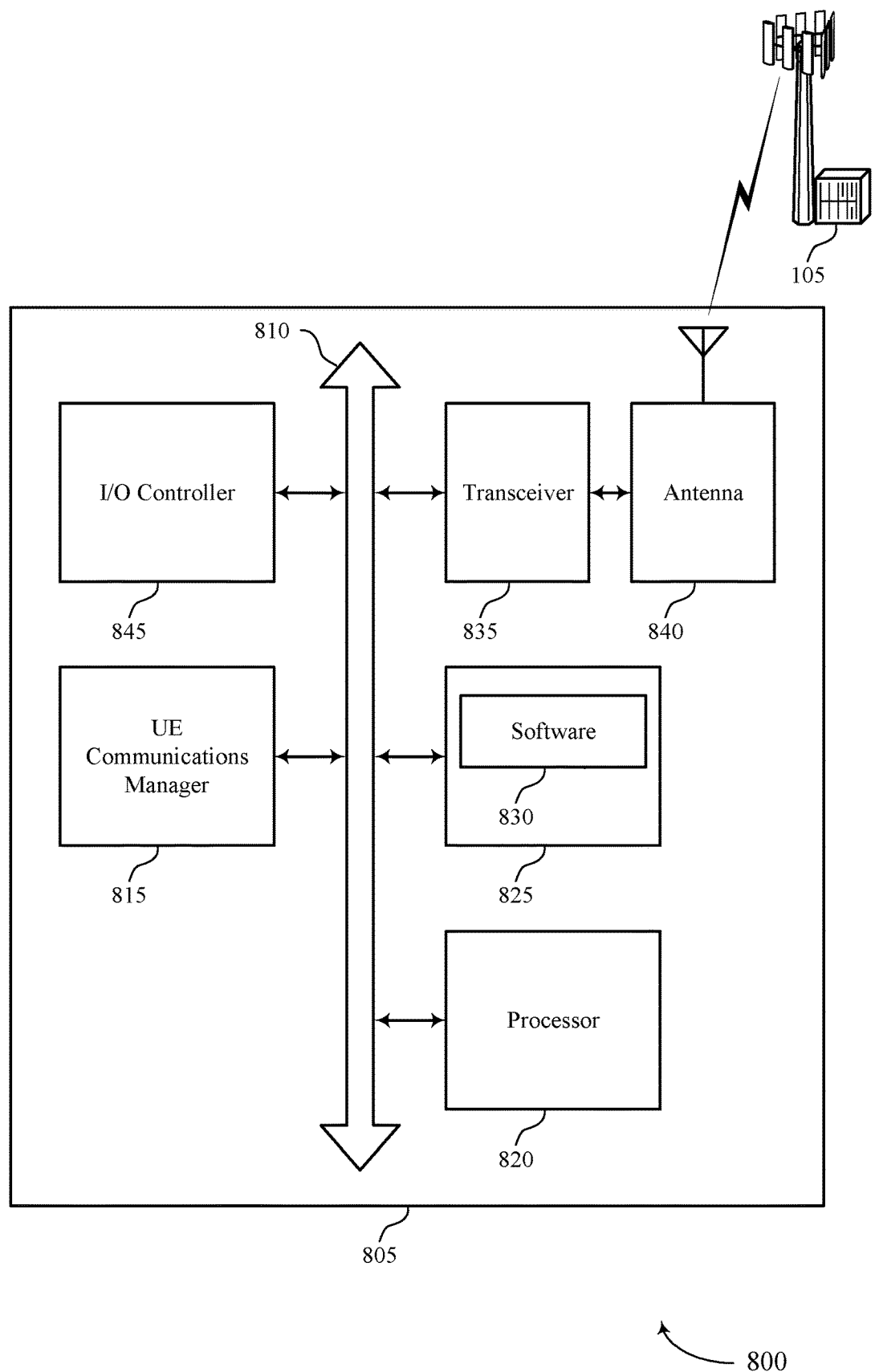
FIG. 8 illustrates a block diagram of a system including a user equipment (UE) that supports CSI reporting for short TTIs in accordance with aspects of the present disclosure.

FIG. 8 illustrates a block diagram of a system 800 including a device 805 that supports CSI reporting for short TTIs in accordance with aspects of the present disclosure. Device 805 may be an example of or include the components of wireless device 605, wireless device 705, or a UE 115 as described above, e.g., with reference to FIGS. 6 and 7. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting CSI reporting for short TTIs).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support CSI reporting for short TTIs. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
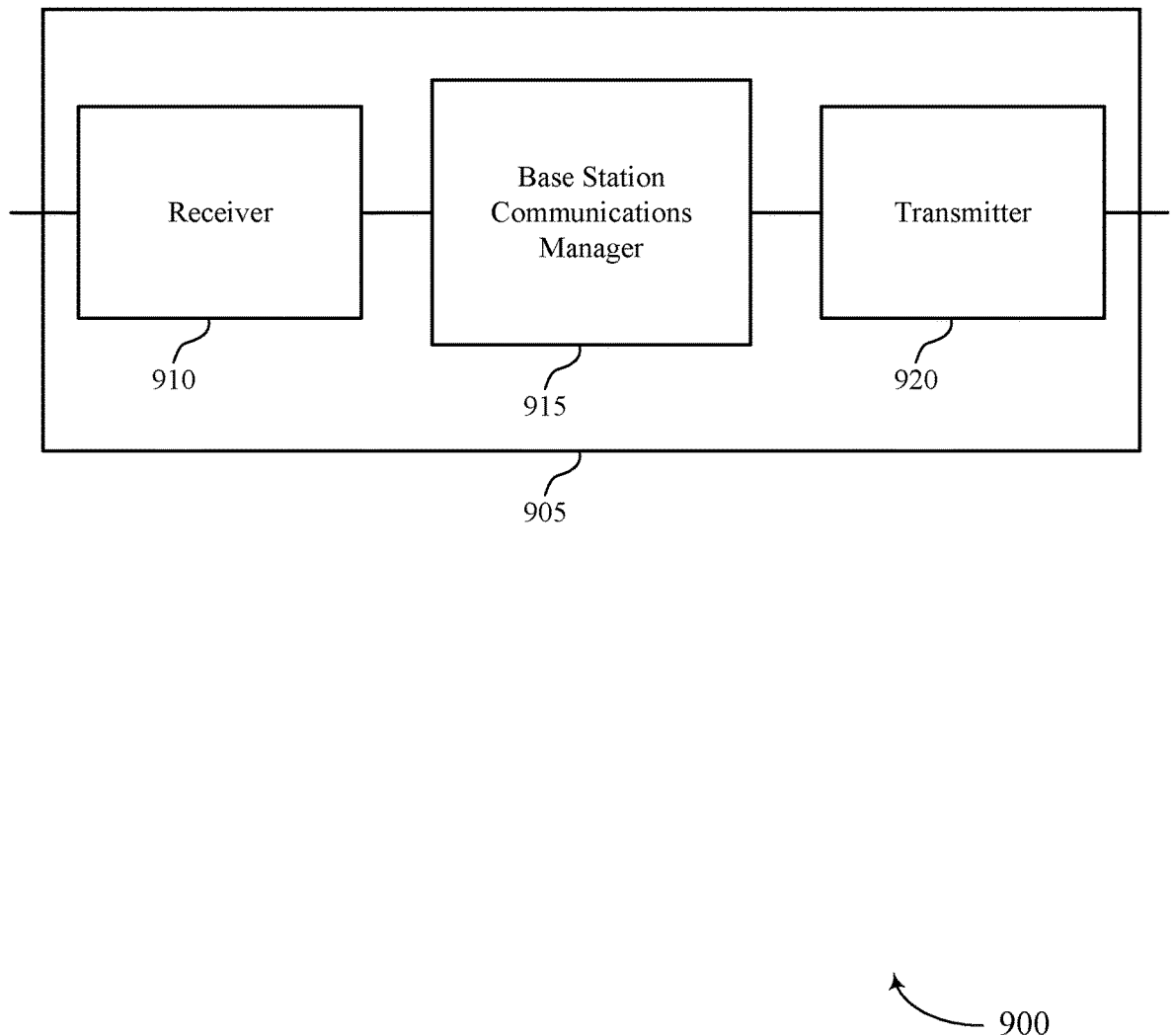
FIGS. 9 and 10 illustrate block diagrams of a wireless device that supports CSI reporting for short TTIs in accordance with aspects of the present disclosure.

FIG. 9 illustrates a block diagram 900 of a wireless device 905 that supports CSI reporting for short TTIs in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to CSI reporting for short TTIs, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify a first CSI reporting configuration associated with TTIs of a first duration, identify a second CSI reporting configuration associated with TTIs of a second duration that is shorter than the first duration, and configure a wireless device to report CSI for the first CSI reporting configuration or the second CSI reporting configuration, or both.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Transmitter 920 may transmit a CSI report in accordance with the determination.

Figure 10:
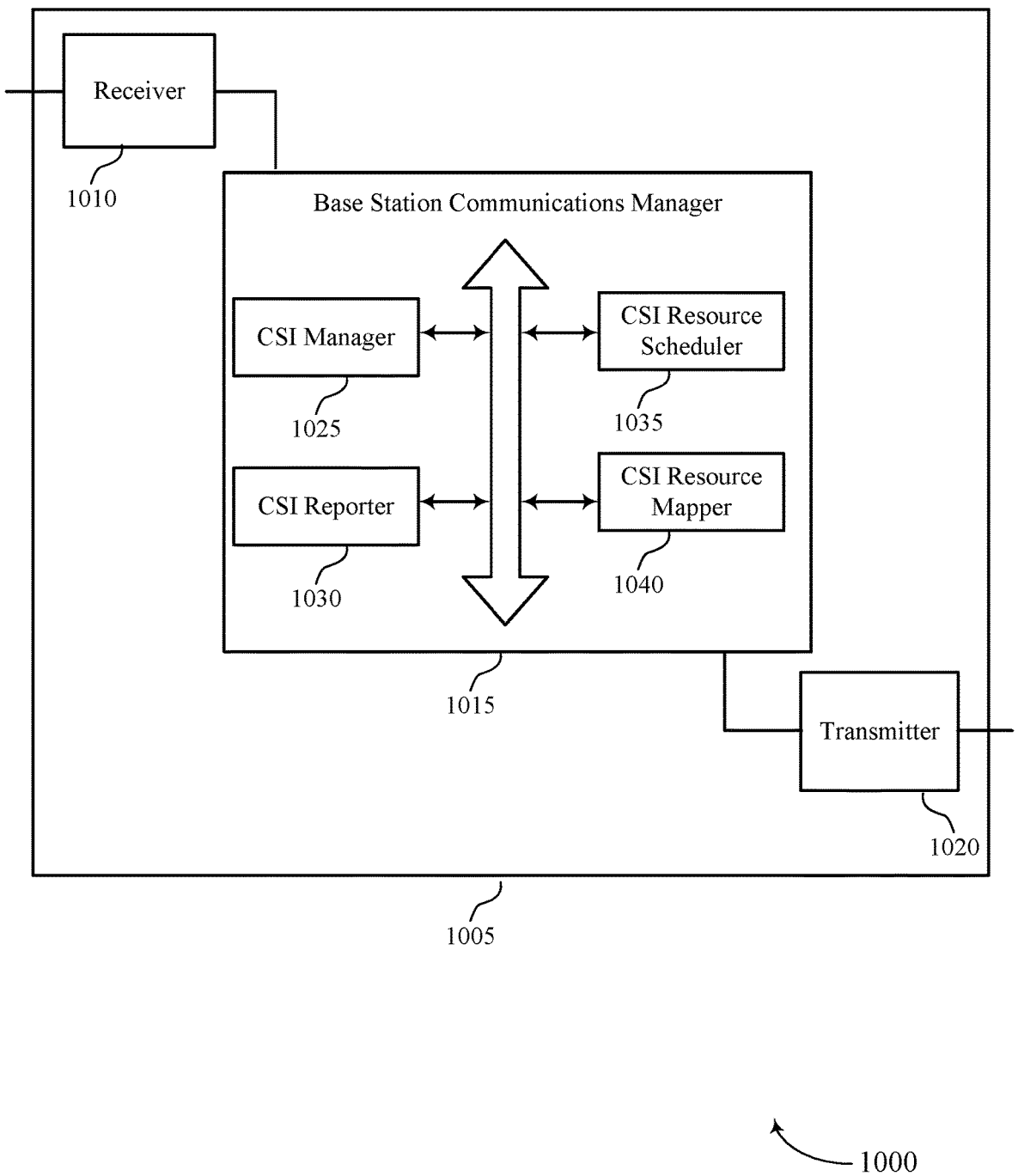

FIG. 10 illustrates a block diagram 1000 of a wireless device 1005 that supports CSI reporting for short TTIs in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to CSI reporting for short TTIs, etc.). Information may be passed on to other components of the device. The receiver 1010 may be an example of aspects of the transceiver 1135 described with reference to FIG. 11. The receiver 1010 may utilize a single antenna or a set of antennas.

Base station communications manager 1015 may be an example of aspects of the base station communications manager 1115 described with reference to FIG. 11. Base station communications manager 1015 may also include CSI manager 1025, CSI reporter 1030, CSI resource scheduler 1035, and CSI resource mapper 1040.

CSI manager 1025 may identify a first CSI reporting configuration associated with TTIs of a first duration and identify a second CSI reporting configuration associated with TTIs of a second duration that is shorter than the first duration.

CSI reporter 1030 may configure a wireless device to report CSI for the first CSI reporting configuration or the second CSI reporting configuration, or both.

CSI resource scheduler 1035 may determine a first periodicity and a first offset for CSI reporting for the first CSI reporting configuration and a second periodicity and a second offset for CSI reporting for the second CSI reporting configuration. In some cases, CSI reporting resources of the second duration are scheduled according to the second periodicity and second offset. In some cases, CSI resource scheduler 1035 schedules CSI resources for the first and/or second CSI reporting configuration on an aperiodic basis.

CSI resource mapper 1040 may map CSI resources for the second CSI reporting configuration. In some cases, CSI resource mapper 1040 maps first CSI reference signal resources to a first pattern for the first CSI reporting configuration and maps second CSI reference signal resources to a second pattern for the second CSI reporting configuration. In some cases, the second CSI reference signal resources, which may be CSI-RS and/or IM resources, partially or completely overlap with the first CSI reference signal resources. In some cases, CSI resource mapper 1040 maps the second CSI reference signal resources to completely overlap with the first CSI reference signal resources when the first CSI reference signal resources comprise NZP CSI-RS and/or IM resources. In some cases, CSI resource scheduler 1035 schedules a TTI of the second duration that comprises the second CSI reference signal resources overlapping with the first CSI reference signal resources.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1135 described with reference to FIG. 11. The transmitter 1020 may utilize a single antenna or a set of antennas.

Figure 11:
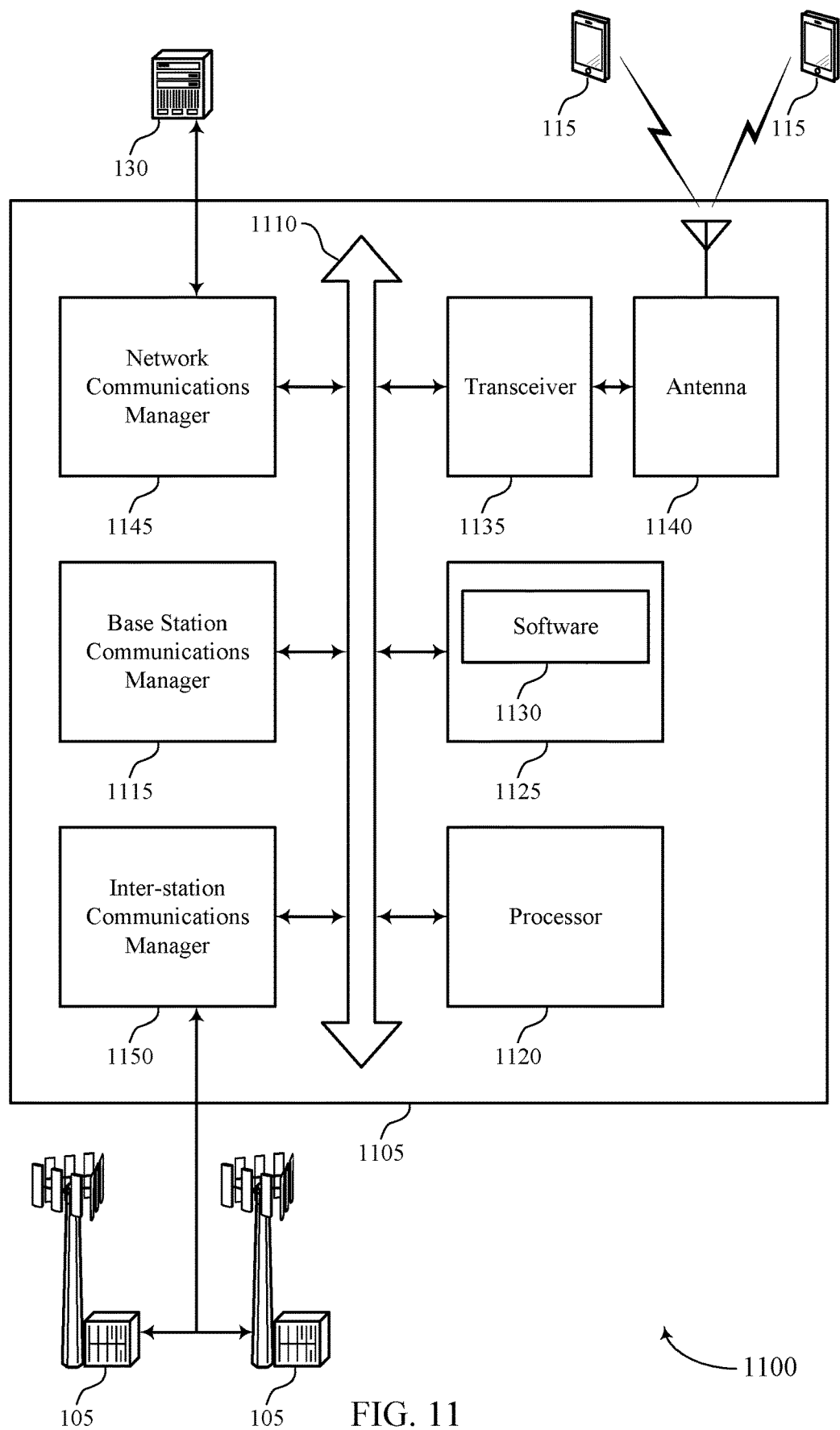
FIG. 11 illustrates a block diagram of a system including a base station that supports CSI reporting for short TTIs in accordance with aspects of the present disclosure.

FIG. 11 illustrates a block diagram of a system 1100 including a device 1105 that supports CSI reporting for short TTIs in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting CSI reporting for short TTIs).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support CSI reporting for short TTIs. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an Long Term Evolution (LTE)/LTE-A wireless communication network technology to provide communication between base stations 105.

Figure 12:
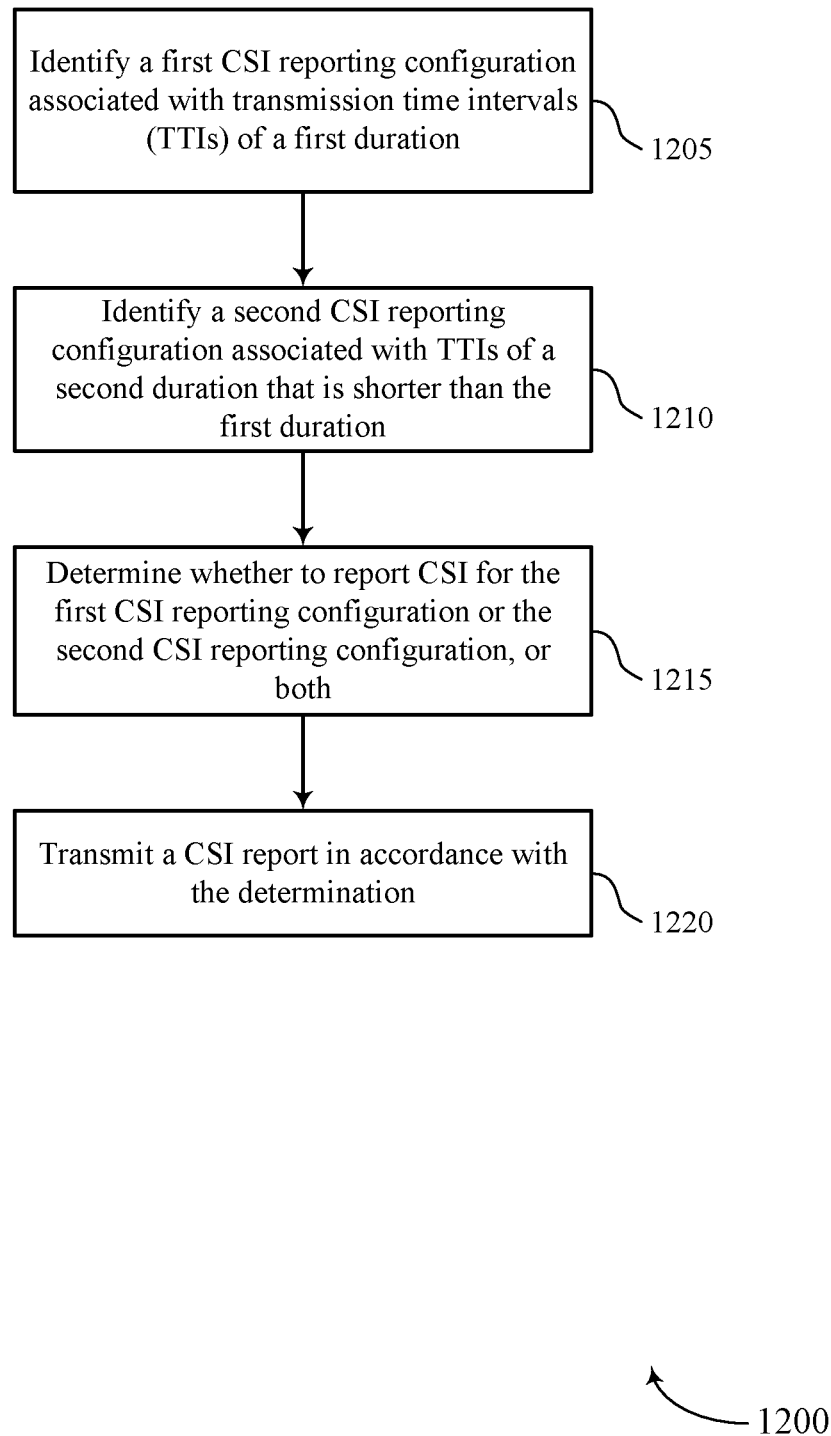
FIGS. 12 through 17 illustrate methods for CSI reporting for short TTIs in accordance with aspects of the present disclosure.

FIG. 12 shows a flowchart illustrating a method 1200 for CSI reporting for short TTIs in accordance with aspects of the present disclosure. The operations of method 1200 may be implemented by a UE 115 or its components as described herein. For example, the operations of method 1200 may be performed by a UE communications manager as described with reference to FIGS. 6 through 8. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify a first channel state information (CSI) reporting configuration associated with TTIs of a first duration. The operations of block 1205 may be performed according to the methods described herein. In certain examples, aspects of the operations of block 1205 may be performed by a CSI manager as described with reference to FIGS. 6 through 8.

At block 1210 the UE 115 may identify a second CSI reporting configuration associated with TTIs of a second duration that is shorter than the first duration. The operations of block 1210 may be performed according to the methods described herein. In certain examples, aspects of the operations of block 1210 may be performed by a CSI manager as described with reference to FIGS. 6 through 8.

At block 1215 the UE 115 may determine whether to report CSI for the first CSI reporting configuration or the second CSI reporting configuration, or both. The operations of block 1215 may be performed according to the methods described herein. In certain examples, aspects of the operations of block 1215 may be performed by a CSI reporter as described with reference to FIGS. 6 through 8.

At block 1220 the UE 115 may transmit a CSI report in accordance with the determination. The operations of block 1220 may be performed according to the methods described herein. In certain examples, aspects of the operations of block 1220 may be performed by a transmitter as described with reference to FIGS. 6 through 8.

Figure 13:
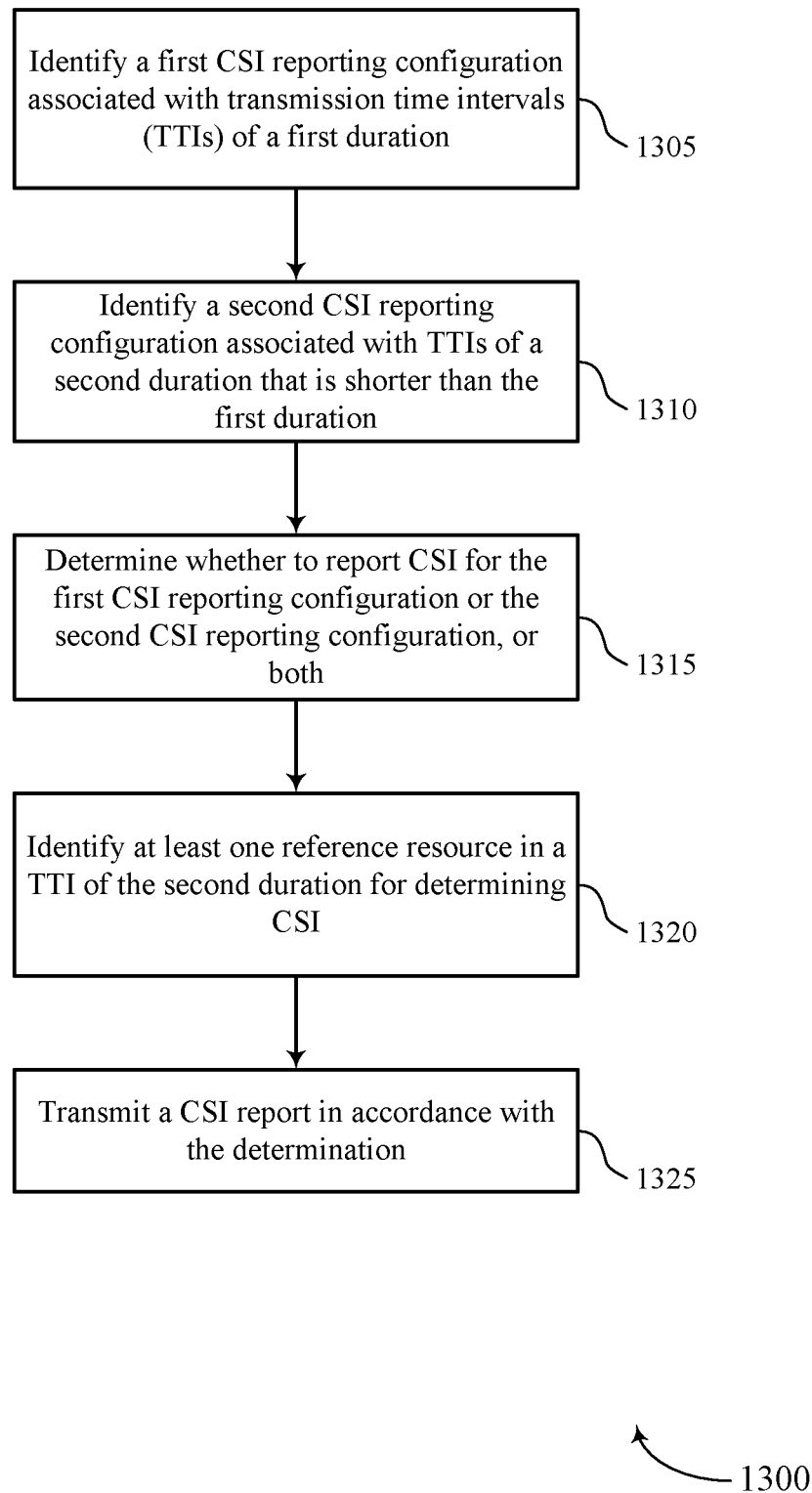

FIG. 13 shows a flowchart illustrating a method 1300 for CSI reporting for short TTIs in accordance with aspects of the present disclosure. The operations of method 1300 may be implemented by a UE 115 or its components as described herein. For example, the operations of method 1300 may be performed by a UE communications manager as described with reference to FIGS. 6 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify a first channel state information (CSI) reporting configuration associated with TTIs of a first duration. The operations of block 1305 may be performed according to the methods described herein. In certain examples, aspects of the operations of block 1305 may be performed by a CSI manager as described with reference to FIGS. 6 through 8.

At block 1310 the UE 115 may identify a second CSI reporting configuration associated with TTIs of a second duration that is shorter than the first duration. The operations of block 1310 may be performed according to the methods described herein. In certain examples, aspects of the operations of block 1310 may be performed by a CSI manager as described with reference to FIGS. 6 through 8.

At block 1315 the UE 115 may determine whether to report CSI for the first CSI reporting configuration or the second CSI reporting configuration, or both. The operations of block 1315 may be performed according to the methods described herein. In certain examples, aspects of the operations of block 1315 may be performed by a CSI reporter as described with reference to FIGS. 6 through 8.

At block 1320 the UE 115 may identify at least one reference resource in a TTI of the second duration for determining CSI. The operations of block 1320 may be performed according to the methods described herein. In certain examples, aspects of the operations of block 1320 may be performed by a CSI resource identifier as described with reference to FIGS. 6 through 8.

At block 1325 the UE 115 may transmit a CSI report in accordance with the determination. The operations of block 1325 may be performed according to the methods described herein. In certain examples, aspects of the operations of block 1325 may be performed by a transmitter as described with reference to FIGS. 6 through 8.

Figure 14:
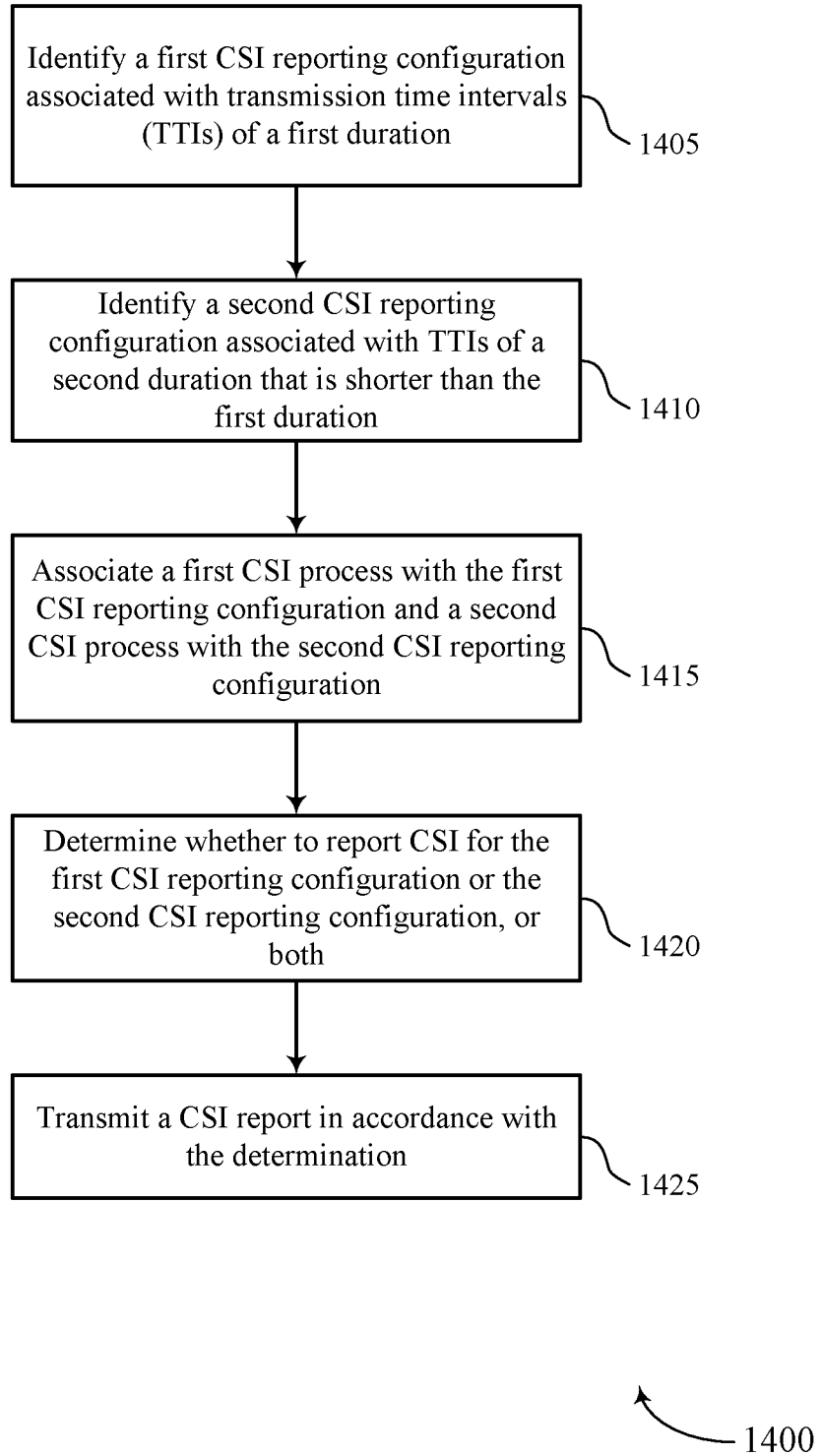

FIG. 14 shows a flowchart illustrating a method 1400 for CSI reporting for short TTIs in accordance with aspects of the present disclosure. The operations of method 1400 may be implemented by a UE 115 or its components as described herein. For example, the operations of method 1400 may be performed by a UE communications manager as described with reference to FIGS. 6 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify a first channel state information (CSI) reporting configuration associated with TTIs of a first duration. The operations of block 1405 may be performed according to the methods described herein. In certain examples, aspects of the operations of block 1405 may be performed by a CSI manager as described with reference to FIGS. 6 through 8.

At block 1410 the UE 115 may identify a second CSI reporting configuration associated with TTIs of a second duration that is shorter than the first duration. The operations of block 1410 may be performed according to the methods described herein. In certain examples, aspects of the operations of block 1410 may be performed by a CSI manager as described with reference to FIGS. 6 through 8.

At block 1415 the UE 115 may associate a first CSI process with the first CSI reporting configuration and a second CSI process with the second CSI reporting configuration. The operations of block 1415 may be performed according to the methods described herein. In certain examples, aspects of the operations of block 1415 may be performed by a CSI manager as described with reference to FIGS. 6 through 8.

At block 1420 the UE 115 may determine whether to report CSI for the first CSI reporting configuration or the second CSI reporting configuration, or both. The operations of block 1420 may be performed according to the methods described herein. In certain examples, aspects of the operations of block 1420 may be performed by a CSI reporter as described with reference to FIGS. 6 through 8.

At block 1425 the UE 115 may transmit a CSI report in accordance with the determination. The operations of block 1425 may be performed according to the methods described herein. In certain examples, aspects of the operations of block 1425 may be performed by a transmitter as described with reference to FIGS. 6 through 8.

Figure 15:
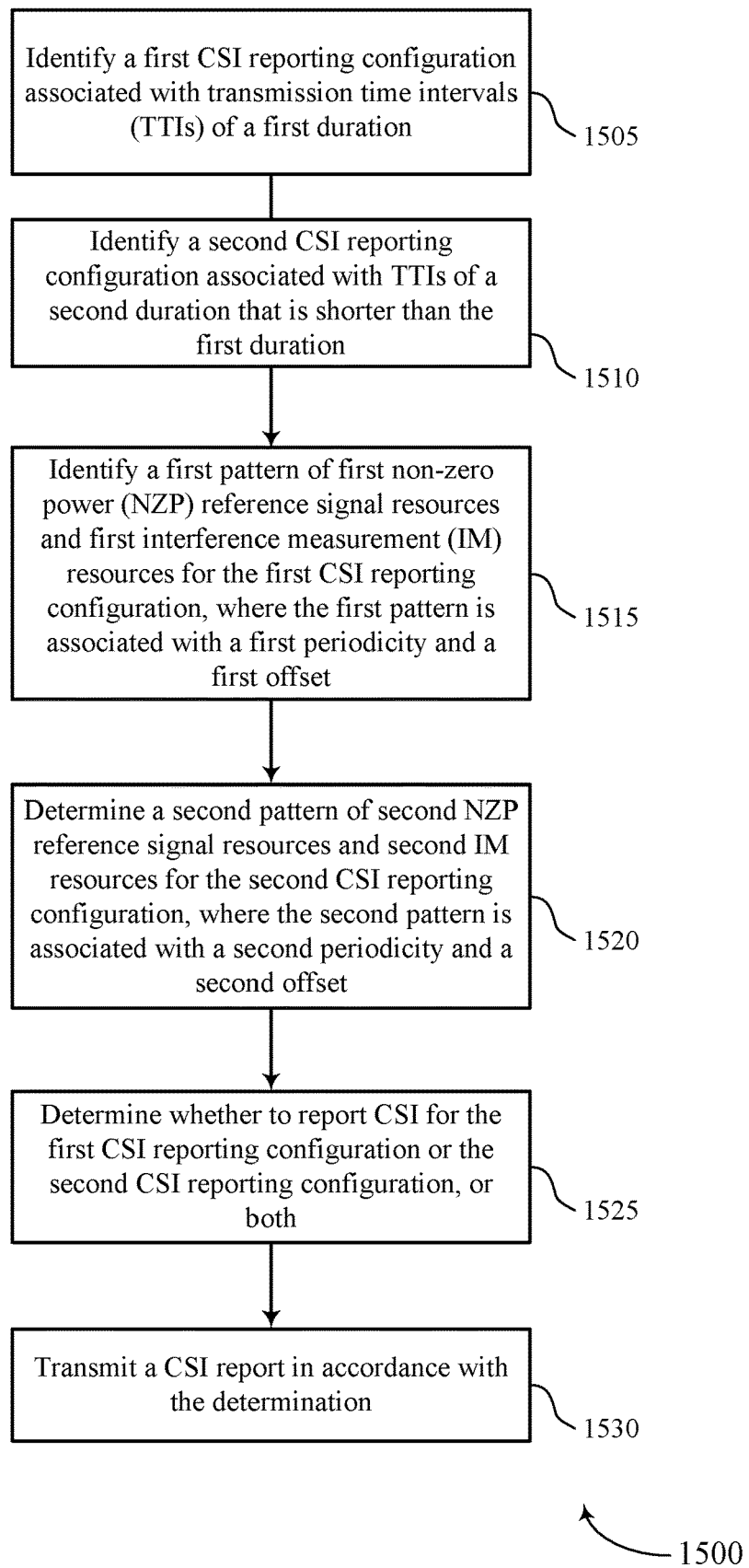

FIG. 15 shows a flowchart illustrating a method 1500 for CSI reporting for short TTIs in accordance with aspects of the present disclosure. The operations of method 1500 may be implemented by a UE 115 or its components as described herein. For example, the operations of method 1500 may be performed by a UE communications manager as described with reference to FIGS. 6 through 8. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify a first channel state information (CSI) reporting configuration associated with TTIs of a first duration. The operations of block 1505 may be performed according to the methods described herein. In certain examples, aspects of the operations of block 1505 may be performed by a CSI manager as described with reference to FIGS. 6 through 8.

At block 1510 the UE 115 may identify a second CSI reporting configuration associated with TTIs of a second duration that is shorter than the first duration. The operations of block 1510 may be performed according to the methods described herein. In certain examples, aspects of the operations of block 1510 may be performed by a CSI manager as described with reference to FIGS. 6 through 8.

At block 1515 the UE 115 may identify a first pattern of first NZP reference signal resources and first interference measurement (IM) resources for the first CSI reporting configuration, wherein the first pattern is associated with a first periodicity and a first offset. The operations of block 1525 may be performed according to the methods described herein. In certain examples, aspects of the operations of block 1525 may be performed by a CSI resource identifier as described with reference to FIGS. 6 through 8.

At block 1520 the UE 115 may determine a second pattern of second NZP reference signal resources and second IM resources for the second CSI reporting configuration, wherein the second pattern is associated with a second periodicity and a second offset. The operations of block 1530 may be performed according to the methods described herein. In certain examples, aspects of the operations of block 1530 may be performed by a CSI resource identifier as described with reference to FIGS. 6 through 8.

At block 1525 the UE 115 may determine whether to report CSI for the first CSI reporting configuration or the second CSI reporting configuration, or both. The operations of block 1515 may be performed according to the methods described herein. In certain examples, aspects of the operations of block 1515 may be performed by a CSI reporter as described with reference to FIGS. 6 through 8.

At block 1530 the UE 115 may transmit a CSI report in accordance with the determination. The operations of block 1520 may be performed according to the methods described herein. In certain examples, aspects of the operations of block 1520 may be performed by a transmitter as described with reference to FIGS. 6 through 8.

Figure 16:
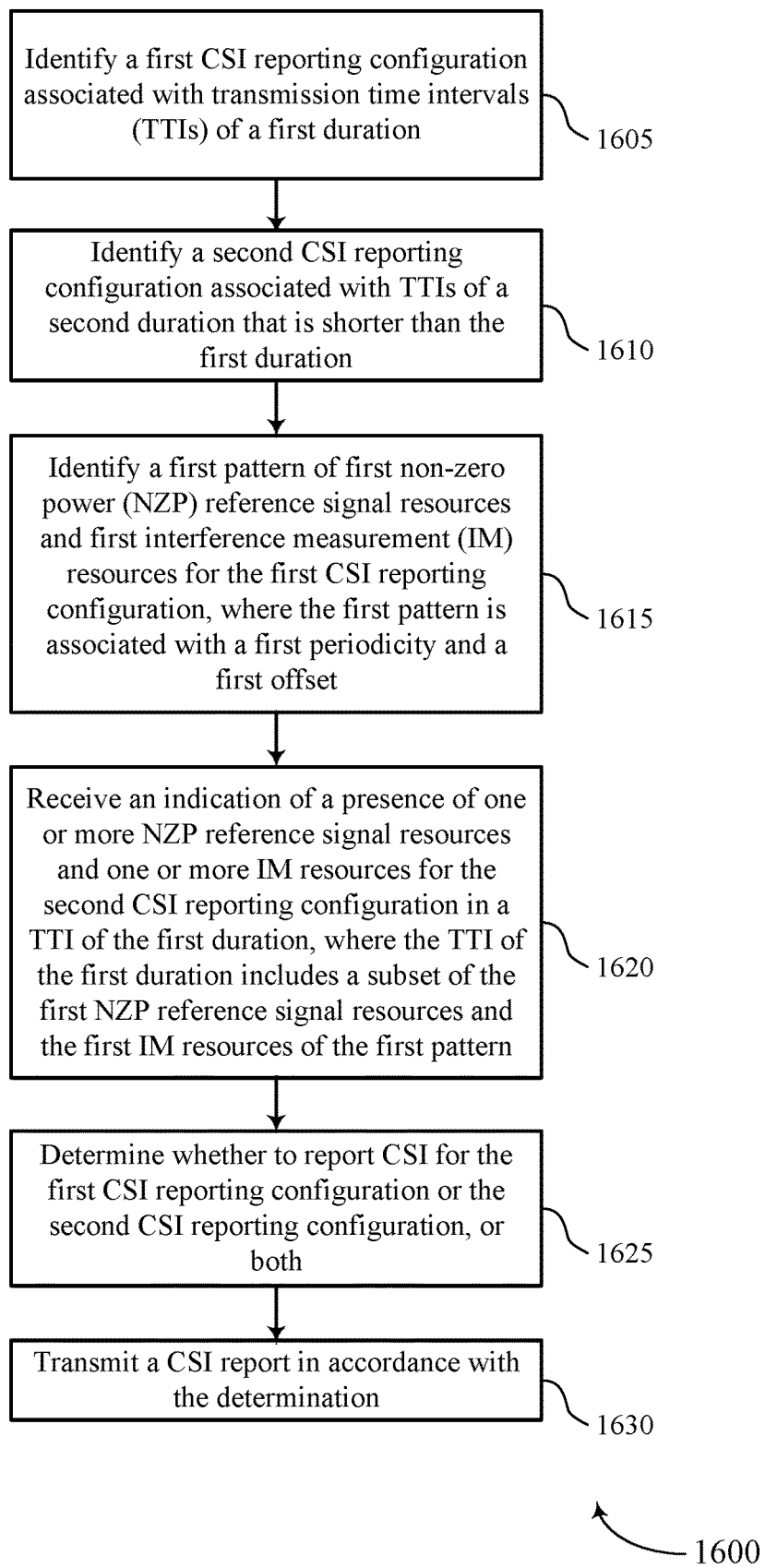

FIG. 16 shows a flowchart illustrating a method 1600 for CSI reporting for short TTIs in accordance with aspects of the present disclosure. The operations of method 1600 may be implemented by a UE 115 or its components as described herein. For example, the operations of method 1600 may be performed by a UE communications manager as described with reference to FIGS. 6 through 8. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a first channel state information (CSI) reporting configuration associated with TTIs of a first duration. The operations of block 1605 may be performed according to the methods described herein. In certain examples, aspects of the operations of block 1605 may be performed by a CSI manager as described with reference to FIGS. 6 through 8.

At block 1610 the UE 115 may identify a second CSI reporting configuration associated with TTIs of a second duration that is shorter than the first duration. The operations of block 1610 may be performed according to the methods described herein. In certain examples, aspects of the operations of block 1610 may be performed by a CSI manager as described with reference to FIGS. 6 through 8.

At block 1615 the UE 115 may identify a first pattern of first NZP reference signal resources and first interference measurement (IM) resources for the first CSI reporting configuration, wherein the first pattern is associated with a first periodicity and a first offset. The operations of block 1620 may be performed according to the methods described herein. In certain examples, aspects of the operations of block 1620 may be performed by a CSI resource identifier as described with reference to FIGS. 6 through 8.

At block 1620 the UE 115 may receive an indication of a presence of one or more NZP reference signal resources and one or more IM resources for the second CSI reporting configuration in a TTI of the first duration, wherein the TTI of the first duration comprises a subset of the first NZP reference signal resources and a subset of the first IM resources of the first pattern. The operations of block 1625 may be performed according to the methods described herein. In certain examples, aspects of the operations of block 1625 may be performed by a CSI resource identifier as described with reference to FIGS. 6 through 8.

At block 1625 the UE 115 may determine whether to report CSI for the first CSI reporting configuration or the second CSI reporting configuration, or both. The operations of block 1615 may be performed according to the methods described herein. In certain examples, aspects of the operations of block 1615 may be performed by a CSI reporter as described with reference to FIGS. 6 through 8.

At block 1630 the UE 115 may transmit a CSI report in accordance with the determination. The operations of block 1630 may be performed according to the methods described herein. In certain examples, aspects of the operations of block 1630 may be performed by a transmitter as described with reference to FIGS. 6 through 8.

Figure 17:
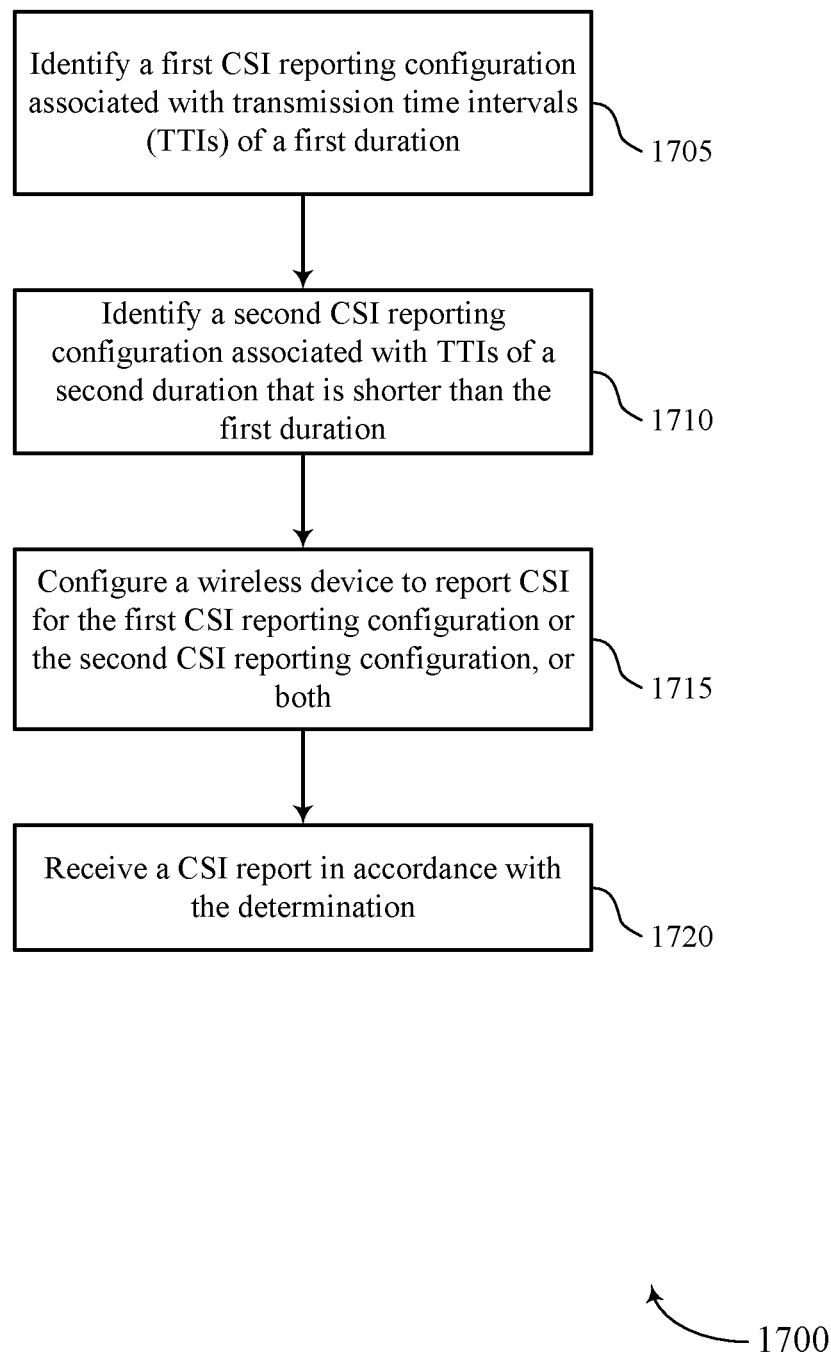

FIG. 17 shows a flowchart illustrating a method 1700 for CSI reporting for short TTIs in accordance with aspects of the present disclosure. The operations of method 1700 may be implemented by a base station 105 or its components as described herein. For example, the operations of method 1700 may be performed by a base station communications manager as described with reference to FIGS. 9 through 11. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify a first channel state information (CSI) reporting configuration associated with TTIs of a first duration. The operations of block 1705 may be performed according to the methods described herein. In certain examples, aspects of the operations of block 1705 may be performed by a CSI manager as described with reference to FIGS. 9 through 11.

At block 1710 the base station 105 may identify a second CSI reporting configuration associated with TTIs of a second duration that is shorter than the first duration. The operations of block 1710 may be performed according to the methods described herein. In certain examples, aspects of the operations of block 1710 may be performed by a CSI manager as described with reference to FIGS. 9 through 11.

At block 1715 the base station 105 may configure a wireless device to report CSI for the first CSI reporting configuration or the second CSI reporting configuration, or both. The operations of block 1715 may be performed according to the methods described herein. In certain examples, aspects of the operations of block 1715 may be performed by a CSI reporter as described with reference to FIGS. 9 through 11.

At block 1720 the base station 105 may transmit a CSI report in accordance with the determination. The operations of block 1720 may be performed according to the methods described herein. In certain examples, aspects of the operations of block 1720 may be performed by a transmitter as described with reference to FIGS. 9 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
   determining a location of a channel state information (CSI) resource and a CSI reporting resource for a CSI report,
   the CSI report being based on the CSI resource,
   the CSI report being based on one of a first CSI reporting configuration or a second CSI reporting configuration,
   the first CSI reporting configuration being associated with transmission time intervals (TTIs) of a first duration,
   the second CSI reporting configuration being associated with TTIs of a second duration,
   wherein the CSI reference resource spans one symbol or two symbols; and
   transmitting the CSI report in accordance with the determination.

2. The method of claim 1, further comprising:
   identifying a first pattern of first non-zero power (NZP) reference signal resources and first IM resources for the first CSI reporting configuration, wherein the first pattern is associated with a first periodicity and a first offset; and
   determining a second pattern of second NZP reference signal resources and second IM resources for the second CSI reporting configuration, wherein the second pattern is associated with a second periodicity and a second offset.

3. The method of claim 2, wherein the second periodicity is higher than the first periodicity.

4. The method of claim 2, wherein the first pattern and the second pattern are completely overlapping, the first periodicity is equivalent to the second periodicity, and the second offset is equivalent to the first offset.

5. The method of claim 2, further comprising:
   determining a third pattern of zero power (ZP) reference signal resources based at least in part on the first pattern; and
   determining a fourth pattern of zero power (ZP) reference signal resources based at least in part on the second pattern.

6. The method of claim 2, wherein the first NZP reference signal resources overlap with the second NZP reference signal resources.

7. The method of claim 2, wherein a resource element density of the second pattern is lower than a resource element density of the first pattern.

8. The method of claim 1, further comprising:
   identifying a first plurality of CSI processes associated with the first CSI reporting configuration and a second plurality of CSI processes associated with the second CSI reporting configuration;
   receiving a request for the CSI report;
   identifying the number of supported CSI processes as a maximum number of supported CSI processes; and
   updating measurements for a first subset of the first plurality of CSI process or a second subset of the second plurality of CSI processes, or both, based at least in part on the maximum number of supported CSI processes.

9. The method of claim 8, wherein updating the measurement comprises updating a lowest-indexed CSI process of the first plurality of CSI processes.

10. The method of claim 8, wherein updating the measurement comprises updating a lowest-indexed CSI process of the first plurality of CSI processes and a lowest-indexed CSI process of the second plurality of CSI processes.

11. The method of claim 1, further comprising:
    identifying a first plurality of CSI processes associated with the first CSI reporting configuration and a second plurality of CSI processes associated with the second CSI reporting configuration;
    receiving a request for the CSI report, wherein the request is associated with the second CSI reporting configuration;
    identifying the number of supported CSI processes as a maximum number of supported CSI processes for the second CSI reporting configuration; and
    updating measurements for a first subset of the second plurality of CSI processes based at least in part on the maximum number of supported CSI processes for the second CSI reporting configuration.

12. The method of claim 1, further comprising:
identifying a first plurality of CSI processes associated with the first CSI reporting configuration and a second plurality of CSI processes associated with the second CSI reporting configuration;
receiving a request for the CSI report, wherein the request is associated with the first CSI reporting configuration;
identifying the number of supported CSI processes as a maximum number of supported CSI processes for the first CSI reporting configuration; and
updating measurements for a first subset the first plurality of CSI processes based at least in part on the maximum number of supported CSI processes for the first CSI reporting configuration.

13. The method of claim 1, further comprising:
associating a first CSI process with the first CSI reporting configuration and a second CSI process with the second CSI reporting configuration.

14. The method of claim 13, further comprising:
generating a first CSI report for the first CSI process or a second CSI report for the second CSI process, or both, wherein the CSI report comprises the first CSI report or the second CSI report, or both.

15. The method of claim 13, wherein the first CSI process is operated independently from the second CSI process.

16. The method of claim 15, wherein the first CSI process for the first CSI reporting configuration is triggered independently from the second CSI process for the second CSI reporting configuration.

17. The method of claim 15, wherein the first CSI process for the first CSI reporting configuration is associated with a first periodicity and a first offset, and wherein the second CSI process for the second CSI reporting configuration is associated with a second periodicity and a second offset.

18. The method of claim 13, wherein the first CSI process is operated jointly with the second CSI process.

19. The method of claim 1, further comprising:
generating first CSI for the first CSI reporting configuration and second CSI for the second CSI reporting configuration, wherein a size of the first CSI is greater than a size of the second CSI; and
generating the CSI report comprising the first CSI or the second CSI, or both.

20. The method of claim 19, wherein generating the first CSI comprises determining a first channel quality indicator (CQI) for at least one subband of a first size, and wherein generating the second CSI comprises determining a second CQI for at least one subband of a second size that is larger than the first size.

21. The method of claim 19, wherein generating the first CSI comprises determining the first CSI according to one of a plurality of reporting modes, and wherein generating the second CSI comprises determining the second CSI according to a subset of the plurality of reporting modes.

22. The method of claim 19, further comprising:
receiving uplink data for transmission with the CSI report, wherein the second CSI is generated based at least in part on the uplink data.

23. The method of claim 22, wherein the CSI report and data are transmitted according to a first interval.

24. The method of claim 1, wherein the location of the CSI resource relative to the CSI reporting resource for the CSI report of the TTIs of the first duration differ from the location of the CSI resource relative to the CSI reporting resource for the CSI report associated of the TTIs of the second duration.

25. The method of claim 1,
the first reporting configuration comprising reporting based on a first CSI resource,
the second reporting configuration comprising reporting based on a second CSI resource, and
the CSI resource being one of the first CSI resource or the second CSI resource.

26. The method of claim 25,
the first CSI resource having a first periodicity, and
the second CSI resource having a second periodicity.

27. An apparatus for wireless communication, comprising:
a processor;
memory coupled with the processor; and
instructions stored in the memory and operable, when executed by the processor, to cause the apparatus to:
determining a location of a channel state information (CSI) resource to and a CSI reporting resource for a CSI report,
the CSI report being based on the CSI resource,
the CSI report being based on one of a first CSI reporting configuration or a second CSI reporting configuration,
the first CSI reporting configuration being associated with transmission time intervals (TTIs) of a first duration,
the second CSI reporting configuration being associated with TTIs of a second duration,
wherein the CSI reference resource spans one symbol or two symbols; and
transmit the CSI report in accordance with the determination.

28. The apparatus of claim 27, wherein the instructions are further executable by the processor to:
identify a first pattern of first non-zero power (NZP) reference signal resources and first IM resources for the first CSI reporting configuration, wherein the first pattern is associated with a first periodicity and a first offset; and
determine a second pattern of second NZP reference signal resources and second IM resources for the second CSI reporting configuration, wherein the second pattern is associated with a second periodicity and a second offset.

29. The apparatus of claim 27, wherein the instructions are further executable by the processor to:
identify a first pattern of first non-zero power (NZP) reference signal resources and first IM resources for the first CSI reporting configuration, wherein the first pattern is associated with a first periodicity and a first offset; and
receive an indication of a presence of one or more NZP reference signal resources and one or more IM resources for the second CSI reporting configuration in a TTI of the first duration, wherein the TTI of the first duration comprises a subset of the first NZP reference signal resources and a subset of the first IM resources of the first pattern.

30. The apparatus of claim 27, wherein the instructions are further executable by the processor to:
associate a first CSI process with the first CSI reporting configuration and a second CSI process with the second CSI reporting configuration.

31. The apparatus of claim 27, wherein the instructions are further executable by the processor to:
generate first CSI for the first CSI reporting configuration and second CSI for the second CSI reporting configuration, wherein a size of the first CSI is greater than a size of the second CSI; and generate the CSI report comprising the first CSI or the second CSI, or both.

32. A non-transitory computer readable medium storing code for wireless communication, the code comprising instructions executable by a processor to:

determining a location of a channel state information (CSI) resource relative to a CSI reporting resource for a CSI report, the CSI report being based on the CSI resource, the CSI report being based on one of a first CSI reporting configuration or a second CSI reporting configuration, the first CSI reporting configuration being associated with transmission time intervals (TTIs) of a first duration, the second CSI reporting configuration being associated with TTIs of a second duration, wherein the CSI reference resource spans one symbols or two symbols; and transmit the CSI report in accordance with the determination.

33. The non-transitory computer-readable medium of claim 32, wherein the instructions are further executable by the processor to:

identify a first pattern of first non-zero power (NZP) reference signal resources and first IM resources for the first CSI reporting configuration, wherein the first pattern is associated with a first periodicity and a first offset; and determine a second pattern of second NZP reference signal resources and second IM resources for the second CSI reporting configuration, wherein the second pattern is associated with a second periodicity and a second offset.

34. The non-transitory computer-readable medium of claim 32, wherein the instructions are further executable by the processor to:

associate a first CSI process with the first CSI reporting configuration and a second CSI process with the second CSI reporting configuration.

35. The non-transitory computer-readable medium of claim 32, wherein the instructions are further executable by the processor to:

generate first CSI for the first CSI reporting configuration and second CSI for the second CSI reporting configuration, wherein a size of the first CSI is greater than a size of the second CSI; and generate the CSI report comprising the first CSI or the second CSI, or both.

* * * * *